(12) United States Patent
Defiebre et al.

(10) Patent No.: US 11,330,048 B2
(45) Date of Patent: May 10, 2022

(54) AFFINITY DETERMINATION AND LOGICAL NETWORKING OF IOT DEVICES

(71) Applicant: SAP SE, Walldorf (DE)

(72) Inventors: Daniel Defiebre, Mannheim (DE); Panagiotis Germanakos, Wiesloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/557,382

(22) Filed: Aug. 30, 2019

(65) Prior Publication Data

US 2020/0267217 A1 Aug. 20, 2020

(30) Foreign Application Priority Data

Feb. 18, 2019 (GR) .............................. 20190100083
May 31, 2019 (GR) .............................. 20190100241

(51) Int. Cl.
*G06F 15/173* (2006.01)
*H04L 67/1042* (2022.01)
(Continued)

(52) U.S. Cl.
CPC ........ *H04L 67/1059* (2013.01); *G06K 9/6215* (2013.01); *H04L 67/303* (2013.01); *H04L 67/306* (2013.01)

(58) Field of Classification Search
CPC . H04L 67/1059; H04L 67/303; H04L 67/306; G06K 9/6215
(Continued)

(56) References Cited

U.S. PATENT DOCUMENTS 7,953,865 B1 5/2011 Miller et al.
9,516,053 B1 * 12/2016 Muddu ............... H04L 63/1433
(Continued)

FOREIGN PATENT DOCUMENTS

WO WO-2019133048 A1 * 7/2019 ............ H04W 72/12

OTHER PUBLICATIONS

Amichai-Hamburger, "Internet and personality," *Computers in Human Behavior*, vol. 18, pp. 1-10 (2002).
(Continued)

*Primary Examiner* — Cheikh T Ndiaye
*Assistant Examiner* — Ayele F Woldemariam
(74) *Attorney, Agent, or Firm* — Klarquist Sparkman, LLP

(57) ABSTRACT

Attributes are applied to Internet-of-Things (IoT) devices to establish high quality connections between the devices. Agents of the devices are assigned to interest-based cells in a virtual space, and can travel among the cells. Within the cells, pairs of devices are tested for similarity, based on device profiles, and for detected affinity. Devices having affinity are connected and form a logical network of IoT devices. Some attributes can be based on a personality model and can reflect the personality of a user or other principal associated with a device. The user or principal attributes can influence requests for affinity testing, calculation of similarity, and further behavioral effects incorporated in affinity determination. Disclosed embodiments provide scalable, distributed, autonomous, and unsupervised device-to-device connectivity, free of prior constraints. Associated infrastructure, simulations, performance metrics, and variations are disclosed.

19 Claims, 18 Drawing Sheets

(51) Int. Cl.
H04L 67/306 (2022.01)
H04L 67/303 (2022.01)
G06K 9/62 (2022.01)

(58) Field of Classification Search
USPC ........................................................ 709/223
See application file for complete search history.

(56) References Cited

U.S. PATENT DOCUMENTS

| | | | |
|---|---|---|---|
| 9,923,893 | B2 | 3/2018 | Ameling et al. |
| 10,484,477 | B2* | 11/2019 | Nasir ........................ H04L 67/10 |
| 2014/0244834 | A1* | 8/2014 | Guedalia .................. H04W 4/08 |
| | | | 709/224 |
| 2016/0357525 | A1 | 12/2016 | Wee et al. |
| 2017/0126834 | A1* | 5/2017 | Fransen ................... H04L 67/12 |
| 2018/0129480 | A1 | 5/2018 | Germanakos et al. |
| 2018/0131576 | A1 | 5/2018 | Sieth et al. |
| 2018/0173184 | A1 | 6/2018 | Kienzle |
| 2018/0199386 | A1* | 7/2018 | Yuan ...................... H04L 67/141 |
| 2019/0141132 | A1* | 5/2019 | Yoo ......................... H04B 1/385 |
| 2019/0268332 | A1* | 8/2019 | Wang ..................... H04L 9/3231 |
| 2019/0354906 | A1 | 11/2019 | Stanciu et al. |
| 2020/0067777 | A1* | 2/2020 | Tandel ................... H04L 43/065 |
| 2020/0076853 | A1* | 3/2020 | Pandian .................. G06N 5/003 |
| 2020/0267045 | A1 | 8/2020 | Defiebre et al. |

OTHER PUBLICATIONS

Amichai-Hamburger et al., "Social network use and personality," *Computers in Human Behavior*, vol. 26, pp. 1289-1295 (2010).

An et al., "Nodes Social Relations Cognition for Mobility-Aware in the Internet of Things," 2011 IEEE International Conference on Internet of Things, IEEE, pp. 687-691 (Oct. 2011).

Atzori et al., "The Internet of Things: A survey" pre-print version, pp. 1-19 (also published as Atzori et al., "The Internet of Things: A survey" *Computer Networks*, vol. 54, No. 15, pp. 2787-2805 (Oct. 2010).

Atzori et al., "SIoT: Giving a Social Structure to the Internet of Things," *IEEE Communications Letters*, vol. 15, No. 11, pp. 1193-1195 (Nov. 2011).

Atzori et al., "Smart Things in the Social Loop: Paradigms, Technologies, and Potentials," pre-print version, 23 pages (Mar. 2013) (also published as Atzori et al., "Smart Things in the Social Loop: Paradigms, Technologies, and Potentials," *Ad Hoc Networks, Elsevier*, vol. 18, pp. 121-132 (Jul. 2014)).

Atzori et al., "Social Internet of Things: Turning Smart Objects into Social Objects to Boost the IoT," Newsletter, *IEEE Internet of Things*, 4 pages (Nov. 2014).

Atzori et al., "The social internet of things (SIoT)—When Social Networks meet the Internet of Things: Concept, Architecture and Network characterization," pre-print version, 39 pages (Jul. 2012) (also published as Atzori et al., "The social internet of things (SIoT)—When Social Networks meet the Internet of Things: Concept, Architecture and Network characterization," *Computer Networks*, vol. 56, No. 16, pp. 3594-3608 (Nov. 2012)).

Bachrach et al., "Personality and Patterns of Facebook Usage," conference paper, 9 pages (Jan. 2012) (also published as Bachrach et al., "Personality and Patterns of Facebook Usage," Proceedings of the 4th Annual ACM Web Science Conference, New York, NY; *ACM Web Sciences*, pp. 24-32 (Jun. 2012)).

Cheng et al., "The Social Web of Things (SWoT)—Structuring an Integrated Social Network for Human, Things and Services," *Journal of Computers*, vol. 9, No. 2, pp. 345-352 (Feb. 2014).

Defiebre et al., "Towards a Human-Centered Model in SIoT," conference paper, 8 pages (also published as Defiebre et al., "Towards a Human-Centered Model in SIoT," in Proceedings of the 5th IEEE International Conference on Internet of People (IOP 2019), *IEEE* (Aug. 2019)).

Ding et al., "The clustering of Internet, Internet of Things and Social Network," in *2010 3rd International Symposium on Knowledge Acquisition and Modeling*, IEEE, pp. 417-420 (Oct. 2010).

Ferwerda et al., "You are What You Post: What the Content of Instagram Pictures Tells About Users' Personality," published in 2nd Workshop on Theory-Informed User Modeling for Tailoring and Personalizing Interfaces (Humanize), *CEUR-WS*, 5 pages (Mar. 2018).

Golbeck et al., "Predicting Personality with Social Media," in CHI '11 Extended Abstracts on Human Factors in Computing Systems; *ACM Press*, pp. 253-262 (May 2011).

Goldberg, "An Alternative "Description of Personality": The Big-Five Factor Structure," *Journal of Personality and Social Psychology*, vol. 59, No. 6, pp. 1216-1229 (1990).

Guinard et al., "Sharing Using Social Networks in a Composable Web of Things," conference paper, 6 pages (Apr. 2010) (also published as Guinard et al., "Sharing Using Social Networks in a Composable Web of Things," *2010 8th IEEE International Conference on Pervasive Computing and Communications Workshops (PERCOM Workshops)*, pp. 702-707 (May 2010)).

Hamburger et al., "The relationship between extraversion and neuroticism and the different uses of the Internet," *Computers in Human Behavior*, vol. 16, pp. 441-449 (Jul. 2000).

Kasnesis et al., "ASSIST: An Agent-Based SIoT Simulator," In 2016 IEEE 3rd World Forum on Internet of Things (WF-IoT), *IEEE*, pp. 353-358, (Dec. 2016).

Kaynar et al., "The effects of Need for Cognition on Internet use revisited," *Computers in Human Behavior*, vol. 24, 361-371 (Mar. 2008).

King et al., "Linking Personality to Helping Behaviors at Work: An Interactional Perspective," *Journal of Personality*, vol. 73, No. 3, pp. 585-607, (Jun. 2005).

Kleanthous et al., "Detecting personality traces in users' social activity," in Social Computing and Social Media, G. Meiselwitz, Ed.; *Springer International Publishing*, pp. 287-297 (2016).

Koreshoff et al., "Approaching a human-centred Internet of Things," conference paper, 4 pages, (Nov. 2013) (also published as Koreshoff et al., "Approaching a human-centred Internet of Things," in *Proceedings of the 25th Australian Computer-Human Interaction Conference: Augmentation, Application, Innovation, Collaboration, ACM*, pp. 363-366 (Nov. 2013).

Kranz et al., "Things That Twitter: Social Networks and the Internet of Things," conference paper, 11 pages (also published as Kranz et al., "Things That Twitter: Social Networks and the Internet of Things," in "What can the Internet of Things do for the Citizen (CIoT), " *Workshop at the 8th International Conference on Pervasive Computing (Pervasive 2010)* (May 2010)).

Lauriola et al., "Personality traits and risky decision-making in a controlled experimental task: an exploratory study," *Personality and Individual Differences*, vol. 31, pp. 215-226 (Jul. 2001).

Manyika et al., "The Internet of Things: Mapping the Value Beyond the Hype," *McKinsey&Company, McKinsey Global Institute*, 144 pages (Jun. 2015).

McCraf, et al, "An Introduction to the Five-Factor Model and Its Applications," *Journal of Personality*, vol. 60, No. 2, pp. 175-215 (Jun. 1992).

Ortiz et al., "The Cluster Between Internet of Things and Social Networks: Review and Research Challenges," *IEEE Internet of Things Journal*, vol. 1, No. 3, pp. 206-215 (Jun. 2014).

Pintus et al., "Humanizing the Internet of Things Toward a Human-centered Internet-and-web of Things," in proceedings of the *11th International Conference on Web Information Systems and Technologies* (WEBIST—2015), pp. 498-503 (Jan. 2015).

Quercia et al., "Our Twitter Profiles, our Selves: Predicting Personality with Twitter," conference paper, 6 pages (Oct. 2011) (also published as Quercia et al., "Our Twitter Profiles, our Selves: Predicting Personality with Twitter," *2011 IEEE International Conference on Privacy, Security, Risk and Trust and IEEE International Conference on Social Computing*, PASSAT/SocialCom 2011.26, *IEEE* (Oct. 2011)).

Rehman et al., "Exploiting Small World Problems in a SIoT Environment," *Energies 2018*, vol. 11, Issue 8, No. 2089, pp. 1-18 (Aug. 2018).

Ross et al., "Personality and motivations associated with Facebook use," article from Psychology Publications, Department of Psychol-

(56) References Cited

OTHER PUBLICATIONS ogy, University of Windsor, 15 pages (Mar. 2009) (also published as Ross et al., "Personality and motivations associated with Facebook use," *Computers in Human Behavior*, vol. 25, No. 2, pp. 578-586 (Mar. 2009)).

Selfhout et al., "Emerging Late Adolescent Friendship Networks and Big Five Personality Traits: A Social Network Approach," *Journal of Personality*, vol. 78, No. 2, pp. 509-538 (Apr. 2010).

Skowron et al., "Fusing Social Media Cues: Personality Prediction from Twitter and Instagram," conference paper, 2 pages (Apr. 2016) (also published as Skowron et al., "Fusing Social Media Cues: Personality Prediction from Twitter and Instagram," in *Proceedings of the 25th International Conference Companion on World Wide Web*, pp. 107-108 (Apr. 2016)).

Amato et al., "A Recommendation System for Browsing of Multimedia Collections in the Internet of Things", Internet of Things and Inter-cooperative Computational Technologies for Collective Intelligence, vol. 460, pp. 391-411, Springer (2013).

Burke, "Semantic ratings and heuristic similarity for collaborative filtering", AAAI Technical Report WS-00-04, pp. 14-20 (2000).

Carbonell et al., "The Use of MMR, Diversity-Based Reranking for Reordering Documents and Producing Summaries", 21$^{st}$ Annual International ACM SIGIR Conference on Research and Development in Information Retrieval, 2 pages (Aug. 1998).

Defifbre et al., "A Human-Centred Business Scenario in SIoT—The Case of DANOS Framework", 5 pages, also published as Defiebre et al., "A Human-Centred Business Scenario in SIoT—The Case of DANOS Framework", 17$^{th}$ IFIP TC 13 International Conference on Human-Computer Interaction, Part IV of Proceedings, pp. 579-583 (Sep. 2019).

Deng et al., "Social network-based service recommendation with trust enhancement", Expert Systems with Applications 41, pp. 8075-8084, Elsevier (Jul. 2014).

Felfernig et al., "Recommendation Technologies for IoT Edge Devices", Procedia Computer Science 110, pp. 504-509 (2017).

Felfernig et al., "An overview of recommender systems in the internet of things", Journal of Intelligent Information Systems, 52, pp. 285-309 (2019).

Forestiero, "Multi-agent recommendation system in Internet of Things", 17$^{th}$ IEEE/ACM International Symposium on Cluster, Cloud and Grid Computing, pp. 772-775 (2017).

Ghauth et al., "Building an E-Learning Recommender System using Vector Space Model and Good Learners Average Rating", Ninth IEEE International Conference on Advanced Learning Technologies, pp. 194-196 (2009).

Lee et al., "Service Recommendation for User Groups in Internet of Things Environments Using Member Organization-Based Group Similarity Measures", 2016 IEEE International Conference on Web Series, pp. 176-283 (2016).

Li et al., "Social recommendation model based on user interaction in complex social networks", PLoS ONE 14(7), pp. 1-17 (Jul. 2019).

Mashal et al., "Toward Service Recommendation in Internet of Things", Seventh International Conference on Ubiquitous and Future Networks, IEEE, pp. 328-331 (Jul. 2015).

Mohammadi et al., "Trust-based recommendation systems in Internet of Things: a systematic literature review", Hum. Cent. Comput. Inf. Sci., pp. 1-61, Springer (2019).

Saleem et al., "Exploitation of Social IoT for Recommendation Services", 7 pages, also published as Saleem et al., "Exploitation of Social IoT for Recommendation Services", IEEE 3$^{rd}$ World Forum on Internet Things, pp. 359-364 (Dec. 2016).

Santos et al., "Exploiting Query Reformulations for Web Search Result Diversification", 19$^{th}$ International World Wide Web Conference, ACM, pp. 881-890 (Apr. 2010).

Sun et al., "Recommendations Based on Collaborative Filtering by Exploiting Sequential Behaviors" (Chinese language document with English language abstract), Journal of Software 24, 11, pp. 2721-2733 (2013).

Zhang et al., "Social recommendation model combining trust propagation and sequential behaviors", Applied Intelligence 43(3), 12 pages (May 2015).

Zhu et al., "Structural Learning of Diverse Ranking", arXiv:1504.04596v2, 12 pages (Apr. 2015).

\* cited by examiner

AFFINITY DETERMINATION AND LOGICAL NETWORKING OF IOT DEVICES

CROSS REFERENCE TO RELATED APPLICATIONS

This application claims priority to Greece Patent Application Number 20190100083 filed Feb. 18, 2019 titled "ANTHROPOMORPHIC INTERNET OF THINGS" and to Greece Patent Application Number 20190100241 filed May 31, 2019 titled "FRAMEWORK AND NETWORK FOR ANTHROPOMORPHIC INTERNET OF THINGS", both of which are hereby incorporated by reference in their entirety.

BACKGROUND

Internet of Things (IoT) holds great promise for enhancing the functioning of devices (Things) through communication both between devices and humans and among devices themselves. As the type and number of IoT devices grows, challenges remain. For example, device-to-device communication requires suitable partner devices to be found. Current approaches can suffer from lack of scalability or artificial constraints in the pool of candidate partners. Accordingly, there remains a need for improved technologies to identify partner devices having affinity with a given device, and to build a logical network of such devices.

SUMMARY

In summary, the detailed description is directed to various innovative technologies for determining affinity between IoT devices or agents, and for building logical networks of the IoT devices or agents.

In certain examples, the disclosed technologies can be implemented as computer-readable media storing instructions causing one or more processors to perform certain operations. Respective profiles of two devices are obtained, each profile including device attributes, interaction attributes, and principal attributes associated with a principal of the device. A similarity score is calculated between the devices based on their profiles, and affinity is determined based on the similarity score. Based on the affinity, a logical network connection between the devices is caused to be formed.

In some examples, the principal can be a user of the respective device. The principal attributes can include personality attributes according to a personality model. The personality attributes can include respective measures of one or more traits selected from extroversion, neuroticism, openness, conscientiousness, or agreeableness. Determining affinity can include determining a first affinity from a perspective of a first device and determining presence or absence of a second affinity from a perspective of the second device. The operations can further include classifying the logical network connection based on the presence or absence of the second affinity.

In further examples, the operations can include adjusting the similarity score for at least one of the devices based on one or more behavioral attributes of either device, and calculating the affinity based on the adjusted similarity score and a threshold value. The adjusted similarity score can be a first adjusted similarity score for a first device, and the operations can also include correspondingly adjusting the similarity score for the other device to obtain a second adjusted similarity score distinct from the first adjusted similarity score. Calculating the affinity can be based on both first and second adjusted similarity scores. The behavioral attribute(s) can be derived from the principal attributes of the respective device. The behavioral attribute(s) can include one or more of: attraction, helpfulness, or interactivity. A behavioral attribute can be jointly dependent on a first principal attribute of the first device and a second principal attribute of the second device. The first and second principal attributes can be distinct.

In certain examples, the disclosed technologies can be implemented as a computer-implemented method. Profiles of two devices are obtained, each profile including device attributes and interaction attributes of the respective device. A similarity score between the devices is calculated based on their profiles. The similarity score is adjusted based one or more behavioral attributes of the devices. Affinity between the devices is determined based on the adjusted similarity score and a threshold value. Based on the determined affinity, a logical network connection is caused to be formed between the devices.

In some examples, the determining of affinity can be bidirectional, while in other examples the determining of affinity can be directional. In the latter case, at least one of the devices can have affinity determined with the other device. The method can include forwarding a request from a first of the two devices to a second of the two devices over the logical network connection, and forwarding a response to the request, from the second device to the first device. The determining affinity can be responsive to identifying a shared interest between the two devices.

In further examples, at least one of the profiles further includes principal attributes associated with the respective device. The method can include determining the principal attributes based on input from a user of the respective device. The similarity score calculation can include calculating respective partial similarities between the device attributes, between the principal attributes, and between the interaction attributes of the two devices; and performing a weighted combination of the partial similarities to obtain the similarity score.

In certain examples, the disclosed technologies can be implemented as computer-readable media storing instructions which, when executed by one or more hardware processors, cause the hardware processors to perform certain operations as follows. A service request is received from a first device. The first device is assigned to a virtual cell for devices having interests similar to the first device, with second and third devices also assigned to the virtual cell. The first device is found to have affinity with the second device, and the first device is found not to have affinity with the third device. Consequently, the first device is directly connected to the second device in a logical network but is not directly connected with the third device.

In additional examples, the determining of affinity with the second device can be based on profiles of the first and second devices. The profile of the first device can include device attributes, principal attributes, and interaction attributes.

The innovations can be implemented as part of one or more methods, as part of one or more computing systems adapted to perform an innovative method, or as part of non-transitory computer-readable media storing computer-executable instructions for causing a computing system to perform the innovative method(s). The various innovations can be used in combination or separately. The foregoing and other objects, features, and advantages of the invention will

DETAILED DESCRIPTION

Overview

Internet of Things (IoT)

Figure 1:
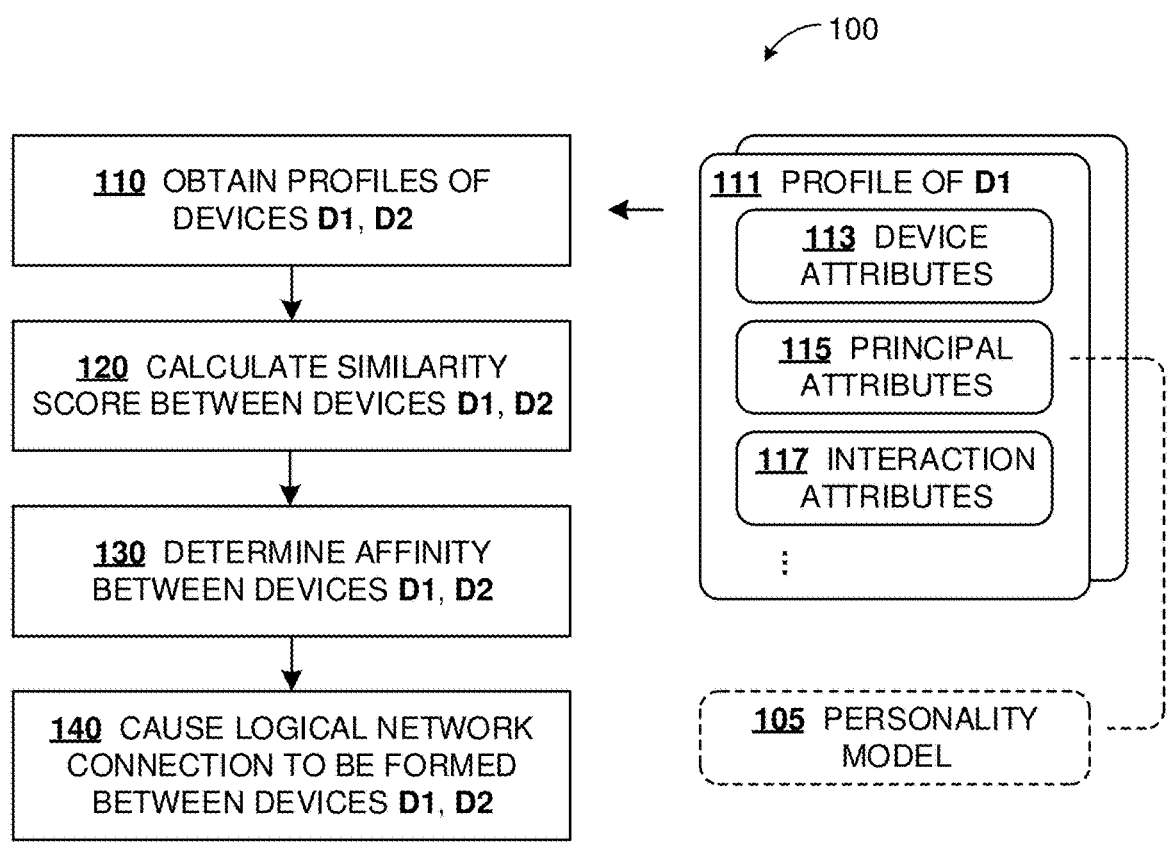
FIG. 1 is a flowchart of an example method according to the disclosed technologies.

Recent studies suggest that by the year 2021 there will be about 50 billion connected IoT devices, capable of leveraging available, accessible, or shareable information in an intelligent network to significantly enhance their functional capabilities. The interconnected devices can have different characteristics, capabilities, and roles and can actively and purposefully communicate with each other to execute specific tasks and provide expected services.

Goals

An objective of the present disclosure is to provide decentralized and scalable technologies that can develop high-quality connections among pairs of IoT devices. Finding suitable connection partners can be termed "matchmaking." The connected devices can form a distributed logical network of IoT devices. A concurrent objective is to support autonomy of the devices, so that individual devices can have more control over their search for partners and establishing connections, according to their respective requirements and capabilities. A further objective is to provide a distributed solution that can be extensible or readily scaled for numbers of devices, device types, or interests. Additional desirable features include: retaining individuality of devices; continuous operation (as distinct from batch-mode operation); providing a decentralized network for broadcast messaging; or low consumption of computing resources.

Problems

At the envisioned scale of IoT, it can be impractical to link or test every pair of devices. Although massive centralized match-making can be considered, it is inherently not scalable, and some narrowing, or pruning, of search space can be desirable. Conventional methods of pruning the search space can have limitations inherent in the pruning approach. For example, searching for connection partners among devices of a same type, manufacturer, or physical location cannot find partners that are of a different device type, from a different manufacturer, or at a remote location. A simple example can illustrate the need for such connections: consider an irrigation controller on a farm that can benefit from data provided by a weather station 100 miles away, where advance notice of a rainstorm can allow the irrigation controller to save water. The irrigation controller and weather station are different device types, far apart, and can likely have different manufacturers.

Centralized approaches to matchmaking can be impractical at scale, can require prohibitive amounts of computational resources (e.g. for identifying patterns), can have difficulty supporting the enormous diversity among IoT devices, and may not be able to provide autonomy to the devices. Approaches based on rules (for example, linking irrigation controllers with upwind weather stations) can be laborious to establish (e.g. one rule for each specific type of functional relationship) and can also be limited by the set of established rules.

Other approaches to match-making can also miss many good candidate partner devices. For example, a technique that relies on a social network of a user, or on some other pre-existing network, can be unable to find suitable matches that are outside such existing network. A technique that randomly chooses device pairs to test can have a very low yield, can miss good partners, or both.

The match-making challenge can be compounded by the enormous diversity of IoT devices as regards e.g. device types, functions, IoT capabilities, computing power, or need for connections.

Approach

The disclosed technologies extend Social Internet of Things (SIoT) concepts by incorporating user or principal attributes into the match-making process, based on a recognition that many devices are ultimately operating to the benefit of a human principal, and that interactions between the devices can usefully be guided by hypothetical interactions between the principals. A human-centered standpoint can be used to facilitate device-to-device interactions and develop effective relationships among devices.

In one aspect, "personality" attributes can be incorporated into a device profile, using a personality model to describe the human principal. In examples, a Big Five personality model can be used. In another aspect, "behavioral" attributes can be associated with a device, to subjectively influence the affinity determined from the perspective of that device for other devices. These attributes can influence the establishment of relationships or connections between pairs of devices that are tested for compatibility, and can also influence how and how often device pairs are selected for testing in the first place. Through incorporation of principal and behavioral attributes, a device can better represent the interests of its principal, and can form connections with those partner devices best suited to assist in the performance of its functions.

The disclosed technologies can also provide a scalable infrastructure to support match-making, establishment of connections, and building of a logical network of IoT devices. In one aspect, each hardware device can be represented by a software device agent, which can be disembodied from the hardware device and can provide equitable interaction between devices regardless of their IoT capabilities, computational power, or dormant power state. In another aspect, the devices can be associated with interests. By way of examples, interests of a TV set can be "movies" or "cat videos" or "mathematics instruction videos;" interests of a refrigerator can be "milk" or "managing spoilage;" both an irrigation system and a weather station can have an interest in "rain." Interests can also be anthropomorphic to the extent that they reflect interests of a human principal. A distributed infrastructure of servers can provide meeting places ("cells") for device agents, organized by interest, so that devices have the opportunity to come in contact with other devices sharing common or similar interests, independent of any pre-existing social or logical network. In a further aspect, device agents can travel among cells and can exercise autonomy in where to travel, how frequently to travel. In some examples, device agents can also exercise autonomy in their availability for new connections, in the rate at which they seek new connections, or in dropping existing connections.

The disclosed technology for match-making is distributed, scalable, and free from prior constraints seen in other approaches. The disclosed technology, guided by interests and attributes, is less resource-intensive (i.e. less data, less storage, less computation) than learning approaches requiring analysis of large volumes of low-quality data (such as mouse clicks and hovers). The cell implementation can provide significant pruning of search space so that devices come in contact with high-quality candidate devices. The "personality" and "behavior" attributes can provide an increased quality of connections that are formed. Moreover, distributing match-making over time, as devices travel among cells, can also reduce the computational burden.

Then, as matches with new partner devices are made, new logical connections can be set up for matched device pairs. Information can be fruitfully exchanged over these logical connections without mediation by a central authority, in a distributed and scalable manner. The exchanged information can allow devices to better perform their functions, and to better serve the needs of their principals.

Personality Model

A personality model can be used to augment a device with additional attributes. These attributes can be integrated into a device profile to provide individualization of the device. The individualization can mimic attributes of a principal of the device, or can reflect another persona. For example, the principal attributes of a smart speaker can be learned from a user, can be selected or configured by a user, or can be factory installed default attributes.

A Big Five personality model can be used to illustrate principal attributes which can be assigned to IoT devices. Five basic attributes included in this model are Extroversion, Agreeableness, Conscientiousness, Neuroticism, and Openness. One or more of these attributes can be included in the principal attributes of a device profile. In some examples, the attributes can be coded with a discrete set of values such as +1 (strong), −1 (weak), or 0 (intermediate), while in other examples, the attributes can be coded with values along a continuous scale, such as 0 to 1, or −1 to +1. In further examples, an attribute can have a set of values for respective facets of the attribute, and can be represented as a tuple or another data structure.

Extroversion can be characterized by excitability, sociability, assertiveness, expressiveness, or a high degree of communication. In the context of affinity determination, a device with a high level of extroversion can make more requests for testing affinity than a device having a low level of extroversion.

Agreeableness can be characterized by trust, altruism, kindness, affection, a desire to help others. In the context of affinity determination, a high level of agreeableness in a candidate device can increase the similarity determined by other devices.

Conscientiousness can be characterized by thoughtfulness, impulse control, or adherence to goal-directed behavior. In the context of affinity determination, a device with high conscientiousness can be more likely to determine affinity with a candidate device having a need (e.g. too few partners), while a device with low conscientiousness can disregard the need of the candidate device.

Neuroticism can be characterized by instability and unpredictability. In the context of affinity determination, a device with high neuroticism can be less likely to take risks, can have a higher threshold for determining affinity, or can determine affinity only with highly similar devices.

Openness can be characterized by having numerous interests, or by a willingness to explore new behaviors or relationships. In the context of affinity determination, a device with high openness can be more likely to take risks, can have a lower threshold for determining affinity, or can determine affinity with dissimilar devices.

Behavioral Expression

Behavioral attributes can affect the behavior of the device with other devices, having effects on a rate at which the device seeks affinity testing with other devices, on the determination of affinity, or on how the device uses established connections to share recommendations or otherwise enhance its functionality. In some examples, a device with high levels of extroversion or neuroticism can have higher rates of seeking affinity testing than devices with low levels of extroversion or neuroticism. A device with a high level of openness can boost its determined similarity with a candidate device, increasing the likelihood of determining affinity. A device with a high level of agreeableness can boost the similarity determined by a candidate device, increasing the likelihood of determining affinity. A device with a high level of neuroticism can be more likely to seek recommendations, while a device with a high level of conscientiousness can be more likely to provide a recommendation. A device with a high level of neuroticism can be more likely to reject a recommendation, while a device with a high level of openness can be more likely to accept a recommendation.

Behavioral effects can be based on personality attributes, on derived attributes such as helpfulness, or on a combination of principal attributes and other attributes. These and other behavioral effects are described further herein.

Infrastructure

The disclosed technologies can be supported by a virtual space of cells among which device agents can be assigned or reassigned. Cells can be hosted on a distributed infrastructure of servers providing software and services for managing device registrations, for identifying candidate devices with which a given device can have affinity tested, for performing affinity testing, or for tuning the cell's own algorithms through learning. The distributed infrastructure can also include servers for hosting device agents, for assigning devices to areas and cells, for supervising the infrastructure, adding cells or areas, or migrating virtual servers, as populations of IoT devices evolve and needs change. As connections between IoT devices are established, a logical network of connected devices can be formed. This logical network can operate autonomously of the cell infrastructure, which can further enhance scalability. Both the infrastructure and the logical device network can be supported over existing physical networks.

Terminology

The usage and meaning of all quoted terms in this section applies throughout this disclosure unless clearly indicated otherwise or repugnant to the context. The terminology below extends to related word forms.

"Affinity" refers to a property of two devices where at least one of the devices is likely to be beneficially served by transfer of information to or from the other device. Determining affinity can include a subjective component, such as based on a behavioral effect as described herein, in contrast to similarity which can be an objective evaluation. Thus, relative to a device D1, two devices D2, D3 having identical device profiles but different behavioral attributes can have identical similarities with D1, S(D1,D2)=S(D1,D3), but different affinity with D1. Affinity can be a binary state (e.g. true/false), but this is not a requirement. Affinity can be directional, the notation A(D1←D2) is used herein to denote affinity for D2 as determined from the perspective of D1 (which can be paraphrased as D1 wanting to form a connection with D2), and can be distinct from A(D2←D1). Affinity can be bidirectional, denoted as A(D1↔D2) and sometimes dubbed "mutual" or "pair" affinity. In some examples, A(D1↔D2) is true if and only if both A(D1←D2) and A(D2←D1) are true, however, this is not a requirement. Alternative definitions for mutual affinity can be used; moreover, in some examples, mutual affinity can be determined without individually calculating the directional affinities. Affinity between two devices can vary over time, or can vary over an interaction space, or can vary due to evolving context. In some examples, affinity can change as connected devices interact and share information. In further examples a determination of affinity can be dependent on a cell in which affinity is tested, e.g. because of different weights used in a similarity calculation or different weights given to behavioral effects.

"Anthropomorphic" refers to attributes or interests of a device that can be described with human characteristics. A device can have attributes resembling a human personality, attributes resembling human behavior, or interests. In some examples, such attributes can represent the actual characteristics of a human principal of the device, while in other examples the attributes can represent an artificial persona configured by a human principal.

An "area" is part of a virtual space having a set of characteristics distinct from other areas. A device can be assigned to an area based on attributes of the device and the characteristics of the area. For example, a device can have an interest in "rain" and the area can be configured for "interest=rain." In other examples, areas can be configured for other attributes besides interest, such as "location=Walldorf" for devices located in Walldorf. Areas can be configured with more than one attribute, e.g. "rain" and "Walldorf;" "rain" OR "snow;" "instructional videos" AND "mathematics." An area can be divided into "cells."

An "attribute" is a variable that characterizes or describes a property of a device. Some attributes can be part of a device profile, while other attributes can be separate from the device profile. Attributes can be static (e.g. device type), time-varying (e.g. powered state, current cell), or accumulating over time (e.g. a history log). Attributes can have binary values (true/false, 0/1); integer values, non-negative integer values, floating point values; string values; or categorical values (e.g. any among a set of valid alternatives). Attributes can be represented by atomic datatypes (e.g. binary, integer), extended datatypes (e.g. string), or can be represented as data structures.

A "behavioral attribute" is a property of a device that describes how the device behaves in its interactions with other devices, including in determinations whether affinity is present. Some examples of behavioral attributes can include helpfulness, risk tolerance, attraction, or need. Need reflects a device having fewer connected partners than desired, and can be derived from a device's interaction attributes. The other example attributes can be derived from personality attributes included in a device's principal attributes.

The virtual space of an area can be subdivided into a plurality of similar "cells." A device assigned to an area can further be assigned to a particular cell of that area, and can travel among the cells of its area. Devices within a common cell can interact, determine affinity, develop relationships, or establish connections. Cells can provide scalability of an area, by reducing the population of candidate devices available for interaction as compared with the overall area. As a device travels among different cells of an area, the device can interact with varying candidate devices. Thus, two devices initially in different cells of an area need not be permanently blocked from finding affinity between them. Rather, the interactions among devices of an area can be distributed over time as the devices migrate among cells. Cells can also provide differentiation within an associated interest. For example, an area for "interest=movies" can have different cells for action movies, animated movies, etc. Cell differentiation can arise spontaneously, e.g. through reinforcement of random fluctuations, or can be explicitly preconfigured. A cell or an area can be associated with computing resources to support the disclosed technologies for devices assigned to the cell. The number of cells in an area can vary over time, due to variations in device populations, rates of affinity tests, or computing resources. In some examples, cells can be assigned numerical coordinates in a multi-dimensional virtual space. Accordingly, a device assigned to a given cell can inherit a virtual position based on the cell coordinates, and the virtual position can evolve as the device travels among cells.

"Classification" refers to a procedure for organizing one or more objects into two or more categories or classes. Often, the categories or classes can be predetermined. Of particular interest in this disclosure is the classification of a relationship between two devices, dubbed "relationship classification." Relationship classes can include: "no relationship" indicating that the devices can remain disconnected, without any direct transfer of information between them; and "full relationship" indicating that the devices can be connected (with an edge of a logical device network). In some examples, relationship classes can include one or more "partial relationship" classes, indicating that while the devices can be connected, data transfer could be limited.

A "connection" refers to a network connection, and often specifically to a logical connection between two devices in a logical network of IoT devices. A connection implies that each device maintains some record of the other device; at least one of the devices has information that allows it to send directed point-to-point communication to the other device, and at least the other device has information that it allows it to identify the sending device as a partner device. In the context of a logical device network, a connection can be regarded as a direct connection, not mediated by other intermediate nodes of the logical device network. However, it will be understood that the connection is ultimately implemented over an underlying physical network and, as such, the connection can incorporate multiple physical links via physical network infrastructure.

A "device" is an Internet-of-Things device. A device can be a tangible object but can include an external software component. A device can have a physical network interface to an Internet over e.g. wireless, wired, optical, acoustic, or other communication medium, allowing the device to communicate with servers, services, or other devices (Things) also connected to the Internet. Devices can receive or send data related to their function. Received data can control events such as an action of the device, a change of state of the device, or an interaction with the physical world around the device. Sent data can report on similar events. Relative to an instant device, a "candidate" device is one with which the instant device has an opportunity to determine affinity or form a connection, and a "partner" device is one with which the instant device has an existing connection, e.g. resulting from a determination of affinity. The disclosed technologies can support a wide range of device types, with varying computing power, IoT capabilities, communication capacity, or power classes. For example, a security system for a home or commercial premises can include significant computing power and wired communication capacity, and can be powered continuously in an always-on state. An automobile can include significant computing power and wireless communication capacity, but can be powered on only occasionally for trips. A battery-powered agricultural moisture sensor can prolong its operational life by waking only intermittently from a low-power state, with minimal computing power or communication capacity. IoT capabilities can vary independently of computing power or communication capacity: an older automobile could have rudimentary communication functionality, supporting little more than status interrogation over a network, while a newer thermostat could have significant built-in capabilities to build relationships and interrogate partner devices.

A "device agent" is a software entity that can represent the device in the disclosed technologies. A device agent can include data (e.g. a device profile) and executable code (e.g. for communicating with infrastructure devices of the disclosed technologies, determining affinity, or maintaining connections with partner devices). A device agent can be resident on the device, on a local host (e.g. a surveillance camera in a building surveillance system can have its device agent located on a same host computer as a controller of the surveillance system), or on a remote host (e.g. a device agent for a GPS device can be located in the cloud). By allowing a device agent to be instantiated separately from the associated device, the disclosed technologies support interoperability between devices having widely varying computing power, IoT capability, or communication capacity. Still, a device agent can act is a proxy for its device, and the terms "device" and "device agent" can often be used interchangeably: actions of a device agent can inure to the device, and attributes of the device can be reflected in the device agent. The device:agent relationship can be one:one or one:many; the latter can occur when a device has multiple principals, with a separate agent for each principal.

A "framework" is a software development model defining an organization of software entities in a system. A framework may not provide details of all the associated software entities; rather, a framework can be customized or extended as needed to meet requirements of a given deployment. A framework can define interfaces between various of the software entities. In some examples, an application built on a framework can have control flow with the framework calling application code, as compared to other architectures in which application code can call library functions.

An "interaction attribute" is a device attribute that provides information about a device's interactions with other devices. Interaction attributes can include lists of connected devices or statistics about attempted and completed connections.

An "interest" is a topic that is relevant to the function or operation of a device. As illustrative examples, a refrigerator can have "milk" as an interest, an irrigation system can have "air temperature," and an automobile's interest can be "gas prices." A device can have one or more interests. Interests can be narrow or broad.

A "network" is a collection of objects and interconnections therebetween. A network can be described as a graph of nodes (the objects) and edges (the interconnections). The networks of this disclosure include an underlying physical network having physical connections (e.g. wired, wireless, optical, etc.) between tangible objects (e.g. IoT devices, networking hardware, and various additional computing resources) and can also include logical networks built on top of the physical network. Of particular interest in this disclosure are (i) the logical networks of the device agents and the infrastructure of the disclosed technologies, and (ii) the decentralized logical network among the IoT devices (or their agents), sometimes dubbed "logical device network." In a logical device network, the nodes can be IoT devices (or agents), and the edges can be point-to-point connections e.g. based on determined affinity.

A "personality attribute" is an attribute, often derived from a personality model, that characterizes a portion of a personality. In an example of a Big Five personality model, exemplary personality attributes can include: extroversion, neuroticism, openness, conscientiousness, or agreeableness. Other personality models can provide fewer, more, or different personality attributes. In a device profile, the principal attributes can include one or more personality attributes.

A "personality model" refers to a system for characterizing a human or anthropomorphic personality in terms of attributes of the personality model, that is, personality attributes. For example, a Big Five personality model can be used, however other models can also be used.

A "principal" refers to an entity that can control or receive benefit from operation of a device. A principal can be a human, such as a user or owner. A device can have more than one principal. For example, a household refrigerator can be used by a family of four, each of whom can be regarded as a distinct principal. A principal can be an organization, an institution, or a part thereof. For example, the principal of a door lock on a home can be a resident, while the principal of a door lock on a police station can be the police department. A principal can be another device. For example, the principal of a surveillance camera can be a surveillance system of which the camera is a part. In examples where the principal is human, some attributes of the device can be based on the human's attributes, or can be determined based on input from the human. In examples where the principal is not human, attributes of the device can be configured based on a representative person of an organization, or on an artificial persona selected to represent the principal.

A "principal attribute" is an attribute within a device profile that describes the principal associated with the device. Some principal attributes can be attributes such as personality attributes, however this is not a requirement. Principal attributes can include a principal identifier (e.g. government identification number) which is not an anthropomorphic attribute. In examples where a principal is not a human, the principal attributes can include anthropomorphic attributes (e.g. of an artificial persona), non-anthropomorphic attributes, or a mix.

A "profile" or "device profile" is a collection of attributes describing a device. Device profiles can conform to a device profile model and can include, in examples, device attributes, interaction attributes, and personality attributes as described further herein. Device profiles can be organized in sections and can be hierarchically organized. Determinations of similarity can be based on comparison or matching of device profiles. Commonly, there is a one:one relationship between device profile and device agent. However, as for device agents, the device:profile relationship can be one:one or one:many; the latter can occur when a device has multiple principals, with a separate profile for each principal.

A "relationship" between two devices refers to the connectivity between the devices. Relationships can be classified as: "no relationship," indicating that the devices can remain disconnected, without any direct transfer of information between them; "full relationship" indicating that the devices can share data over a mutual connection; or "partial relationship," indicating that while the devices can be connected, information exchange could be limited. Data transfer limitations could be directional (e.g. data relevant to an interest can be transferred from D1 to D2, but not in the reverse direction) or based on e.g. trust or sensitivity (e.g. a door lock could accept sensitive information such as an unlock command only from partners at a high trust level, but could accept less sensitive information such as availability of a software update at a lower trust level). A relationship can be determined based on affinity, on similarity, on shared interest, a common context, or a common environment, and can also evolve with time, e.g. based on growing trust. Other factors can also impact relationship classification, such as a device's IoT capabilities, the functional relationship between dissimilar devices, or a particular interest. Some IoT devices can have very limited IoT capabilities, e.g. as a sender with no functional use for received data; a full relationship with such a device could be inappropriate. Dissimilar devices like a weather station and an irrigation controller can have an inherently directional functional relationship: the irrigation controller can benefit from learning of rain from the weather station, but the weather station may derive no benefit from information that the irrigation controller can provide. Again, a full relationship can be inappropriate. In a further example, two refrigerator devices D1, D2 can share multiple interests, such as milk and apples. Through experience, D1 may determine that recommendations from D2 are good for milk, but not good for apples. So, over time, D1 can downgrade its relationship with D2 as regards apples to partial or no relationship, while maintaining full relationship for the milk interest. Relationships can also be classified in other ways. A parent-child relationship can indicate supervision of a child device (e.g. a door lock) by a parent device (e.g. a home security controller). Sibling relationships can indicate commonality of manufacturer, production batch, or principal. A co-location relationship can indicate presence in a common area, such as a smart home or a smart city. A co-work relationship can indicate devices participating in a collaborative enterprise. For example, in a surgical setting, a robotic surgery tool, an endoscope, and vital function monitors can have a co-work relationship. A social relationship can exist between devices whose users or other principals have a social relationship, and can be sporadic at the actual periods of time when the respective principals are interacting, or long-lived across such interactions and gaps therebetween.

"Relationship manager" (RM) refers to an infrastructure component that determines similarity or affinity between devices. In examples, the RM can apply behavior effects, relationship classification, or threshold update as described herein. In some examples, each cell can have its own RM, offering parallelization and scalability. Alternatively, similarity or affinity can be determined on a device, for example, to comply with data privacy requirements.

"Scalability" refers to a property of a computing system to perform increasing work as increasing resources are added to the computing system. Particularly, a scalable system can handle an amount of work N with about O(N) computing resources. Systems in which units of work are separable can often be scalable, while systems in which units of work interact can get bogged down by e.g. inter-process communication and may not be scalable.

"Similarity" is a property or score reflecting the degree to which profiles of two devices are closely matched. Similarity can be measured on a scale, such as 0 to 1. Similarity can be undirected, i.e. S(D1,D2)S(D2,D1). Similarity can be determined using cosine similarity, Jaccard similarity, or a distance measure (e.g. Euclidean, Manhattan, or Minkowski distance) in an artificial vector space formed by the various attributes of a device profile. A partial similarity can be obtained by comparing a part of a device profile with the corresponding part of another device's profile. The similarity between two devices can be determined by combining multiple partial similarity scores. Weights can be incorporated, for partial scores or attributes.

"Software" refers to instructions that can be performed by a computing device and to the associated input or output data. Various terms are used throughout this disclosure to describe software entities. A "service" can be called one or more times to perform a specific function, an "engine" or "agent" can perform ongoing functions for a particular activity or entity, and a "manager" or a "system" can provide or coordinate multiple functions for a group of related activities. The executing software can be supported by relevant temporary or persistent data. "Layers" and "spaces" are provided as conceptual aids and need not provide any specific software functionality beyond that of their included software entities.

A "threshold" is a boundary value for a test quantity, wherein a different result can be reached or different actions can be performed according to whether the test quantity is above or below the threshold. In some examples herein, comparison of a similarity score with a threshold can be used to make a determination of affinity.

A "user" is a person who performs a control operation on a device, or who derives a benefit from the operation of the device.

First Example Method

FIG. 1 is a flowchart 100 of an example method according to the disclosed technologies. Given two devices, their similarity score can be calculated and used to determine affinity. In turn, based on affinity, a logical network connection can be formed between the two devices.

At process block 110, the profiles of two devices D1, D2 can be obtained. Each device profile 111 can include attributes 113 pertaining to the device itself, attributes 115 pertaining to a principal of the device, and attributes 117 describing interactions of the device. The device profiles for the two devices can be compared to calculate a similarity score at process block 120. Then, at process block 130, affinity between the devices can be determined. Responsive to a determination of affinity, a logical network connection between the devices can be formed, or caused to be formed, at process block 140.

Numerous variations of this method are possible. In examples, the principal can be a user of the device, an owner of the device, a supervisor of the device, or a fictitious persona. The principal attributes 115 can include personality attributes according to a personality model. The personality attributes can include measures of one or more of the following traits: extroversion, neuroticism, openness, conscientiousness, or agreeableness.

The determination of affinity can be directional or mutual. Affinity can be evaluated from the perspective of one or both devices. If affinity is found from the perspective of one device and from the perspective of the other device, then the devices can be determined to have mutual affinity. If affinity is found from the perspective of one device but not from the perspective of the other device, then the devices can be determined to have directional affinity. If affinity is found from neither device's perspective, then the devices are not determined to have affinity, and are determined to not have affinity. The preceding lines describe determining mutual affinity based on determining of two directional affinities, i.e. in both directions, however this is not a requirement. In other examples, mutual affinity can be determined without recourse to directional affinities or any directional perspective. For example, mutual affinity can be determined simply by comparing the similarity score to a threshold.

Establishment of a logical network connection can be dependent on a finding of mutual affinity, on a finding of directional affinity, or on a finding of at least directional affinity. In some examples, device relationships can be peer relationships and establishment of a logical network connection can require mutual affinity. In other examples, device relationships can be asymmetric (e.g. a producer-consumer relationship, a client-server relationship, or a master-slave relationship), and a directional connection can be formed based on directional affinity. In such examples, mutual affinity can be blocked by design, can be tolerated but ignored, or can be flagged as an error. In further examples, relationships can be elastic with varying amounts of symmetry: a logical network connection can be formed upon a finding of at least directional affinity. The logical network connection can be classified according to whether mutual affinity exists or only directional affinity. The utilization of such a connection can also vary according to whether mutual affinity exists or not.

In some examples, and as described herein, the determination of affinity can include adjusting the similarity score based on behavioral attributes of one or both devices. Affinity can be determined based on the adjusted similarity score and a threshold. For example, affinity can be found if the adjusted similarity score is greater than or equal to a threshold. As for affinity, the adjustment of similarity score can be performed from the perspective of one device, with this adjusted similarity score used to determine a directional affinity, or alternatively on a non-directional basis. In some examples, two adjusted similarity scores are determined, one from the perspective of each device. Affinity can be determined based on both the adjusted similarity scores.

The similarity adjustment can incorporate one or more behavioral effects. A behavioral effect can be based on a single behavioral attribute of a single device, on a single behavioral attribute of both devices, on multiple behavioral attributes of a single device, on a combination of a first behavioral attribute of one device and a different second behavioral attribute of the other device, or any combination of behavioral attributes. Behavioral effects can also be based on a combination of one or more behavioral attributes with one or more non-behavioral attributes. Examples of behavioral effects and behavioral attributes are described herein.

A behavioral attribute can be derived from a principal attribute of a same device, as described herein. A behavioral attribute of one device can be jointly dependent on a first principal attribute of the one device and on a different second principal attribute of the other device.

The dependence of a behavioral attribute on an underlying principal attribute can be different for different device types, or can vary based on other attributes or other behavioral attributes. Commonly, a numerical representation of such dependence can be monotonic, but this is not a requirement.

Example Device Profile Model

Figure 2:
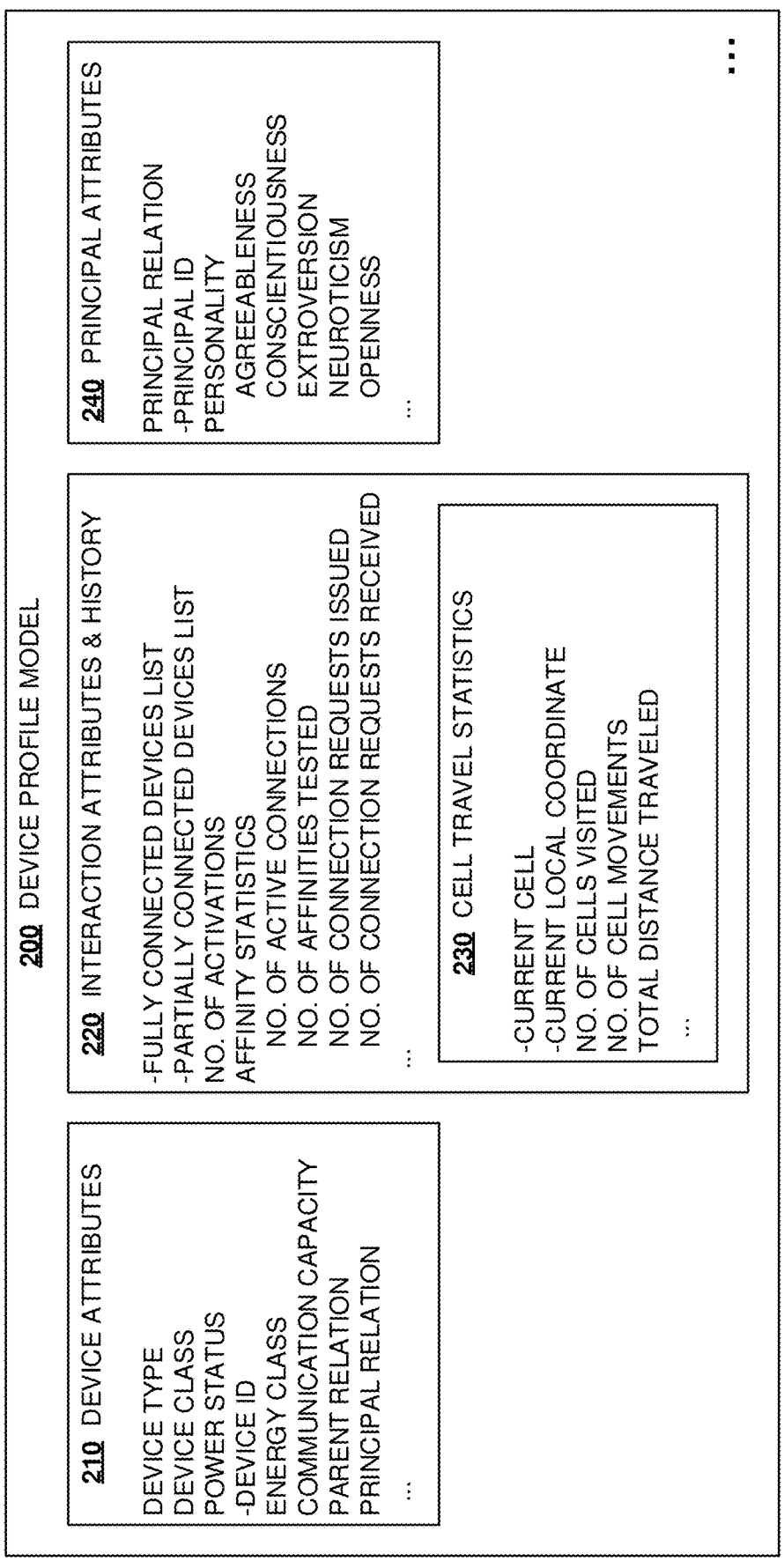
FIG. 2 is a diagram of an example device profile model according to the disclosed technologies.

FIG. 2 is a diagram of an example device profile model 200 according to the disclosed technologies. A device profile model 200 can be a template indicating how to characterize a device. A device profile of a device can be an instantiation of device profile model 200, and can be used with the disclosed technologies to identify suitable partner devices with which beneficial relationships or logical network connections can be formed. The device profile model 200 is not limited merely to attributes of a tangible physical device, but can also incorporate attributes reflecting software, configuration data, accumulated history, as well as other devices, persons, or entities with which the device has a relationship. In this example, the device profile model 200 is organized in sections 210, 220, 230, 240. The attributes of each section 210-240 can be regarded as occupying respective subspaces of an entire attribute space. Device profile model 200 is only an example; alternative models can be used in deployments of the disclosed technologies. Multiple distinct models can be used within a single deployment.

In the illustrated example, the device's own attributes can be organized in section 210 titled "Device Attributes." Some device attributes are briefly described. A Device Type attribute can indicate the type of a device, such as a refrigerator, copy machine, irrigation valve, door lock, automobile, and many more. A Device Class attribute can indicate computation or communication capabilities of the device. Two devices of a same type can have different classes, for example a refrigerator having rudimentary capabilities to identify itself and report status or error codes, or another refrigerator having more sophisticated capabilities to manage its contents. Additionally, the class can be varied over time, for example, some capabilities can be disabled when in offline, battery-powered operation. Another attribute Power Status can indicate whether the device is operating on battery power or on mains power, and can additionally provide a Battery Level or charging state indication. A Device ID attribute can be a serial number or universally unique identifier (UUID) of the device. An Energy Class attribute can indicate modes of operation of the device, such as intermittent battery-powered operation, steady battery powered operation, reduced power operation on battery, or mains powered operation. A Communication Capacity attribute can indicate the physical throughput (e.g. in bits per second) or number of parallel logical connections (e.g. to network infrastructure, or to other connected devices) that a device can support. A Parent Relation attribute can indicate whether the device is controlled by another device (such as a security camera controlled by a security control station) or operates autonomously. A Principal Relation attribute can indicate a type of principal associated with the device (such as a user person, an owner person, or an organization) and can indicate whether the device is affiliated with more than one principal.

In the illustrated example, the attributes indicating a device's interactions can be organized in section 220 titled "Interaction Attributes." A Fully Connected Devices List can be a list of devices with which a present device has full connections over a logical network. This list is an example of an attribute that can be a data structure rather than an atomic data element. Similarly, a Partially Connected Devices List can be a list of devices with which a present device has partial connections over a logical network. In examples, a full connection can be formed when mutual affinity between devices has been determined, while a partial connection can be formed when only directional affinity has been determined. A No. of Activations attribute can indicate the number of times the present device has been activated. On each activation, the device can travel or can issue a connection request, with respective probabilities. A group of Affinity Statistics attributes can include a No. of Active Connections attribute indicating a number of other devices with which a present device is logically connected; a No. of Affinities Tested attribute indicating a number of times affinity has been tested between the instant device and other devices (including times when affinity was found and times when affinity was not found; a given pair of devices can be tested multiple times); a No. of Connection Requests Issued attribute indicating the number of times the instant device has issued a request to find affinity with another device; and a No. of Connection Requests Received attribute indicating the number of times the instant device has received a request to be tested for affinity with another device.

Within the section 220, cell travel statistics can be organized as a sub-section 230. That is, the organization of Device Profile Model 200 can be hierarchical. Some of these attributes are briefly described. A Current Cell attribute can indicate a cell to which the device is currently assigned, or the coordinates of the current cell in a virtual space. A Current Local Coordinate attribute can be used to indicate a local coordinate position within the current cell. That is, in some examples, a device agent can be variously positioned within a cell. Weights for similarity calculation can depend on this local coordinate position. In some examples, devices can have varying probability of interacting with other devices within the cell, e.g. according to the distance between them. A No. of Cells Visited attribute can indicate how many cells an instant device has traveled to, which reflects the number of other devices the instant device could have encountered, for the opportunity to build logical network connections. A No. of Cell Movements attribute can indicate how many times the device has hopped to a different cell. This attribute can be different from the number of cells visited because the device can visit cells varying numbers of times. For example, a device can sample other cells but always return to a "home" cell, in which case after eight Cell Movements, the device has only visited 4+1=5 cells. The home cell of a given device can be a cell having a highest proportion of candidate devices similar to the given device. A Total Distance Traveled attribute can be used in conjunction with a distance metric for the cells. Each time the device hops to a different cell, the distance metric between starting and ending cells can be computed and added to the Total Distance Traveled attribute.

As described herein, device profiles can be used to determine affinity between devices. However, it is not required that all attributes be used for determining similarity or affinity. In FIG. 2, certain attributes are marked with a "-" (such as "-Device ID") to indicate that these attributes could be omitted from a determination of similarity or affinity.

In the illustrated example, the attributes of a device's principal can be organized in section 240 titled "Principal Attributes." Some principal attributes are briefly described. A Principal Relation attribute can indicate whether a type of the principal (such as a user person, an owner person, or an organization). A Principal ID attribute can provide an identifier of the principal, which can be a locally unique identifier (such as an employee identification number) or a universally unique identifier (such as a combination of country and social security number or equivalent national identification number; a mobile phone number; or a biometric signature). Personality attributes can be measures of respective attributes of the principal according to a personality model as described herein. As illustrated, exemplary personality attributes can include Agreeableness, Conscientiousness, Extroversion, Neuroticism, or Openness.

Numerous variations are possible. In examples, a device profile model 200 can specify a range of values or discrete values that can be valid for a given attribute. Sections of the device profile model can be hierarchical. The example model 200 is merely illustrative; other models can include more or fewer sections, and each section can have more or fewer attributes than illustrated.

Example Behavioral Effects

Figure 3:
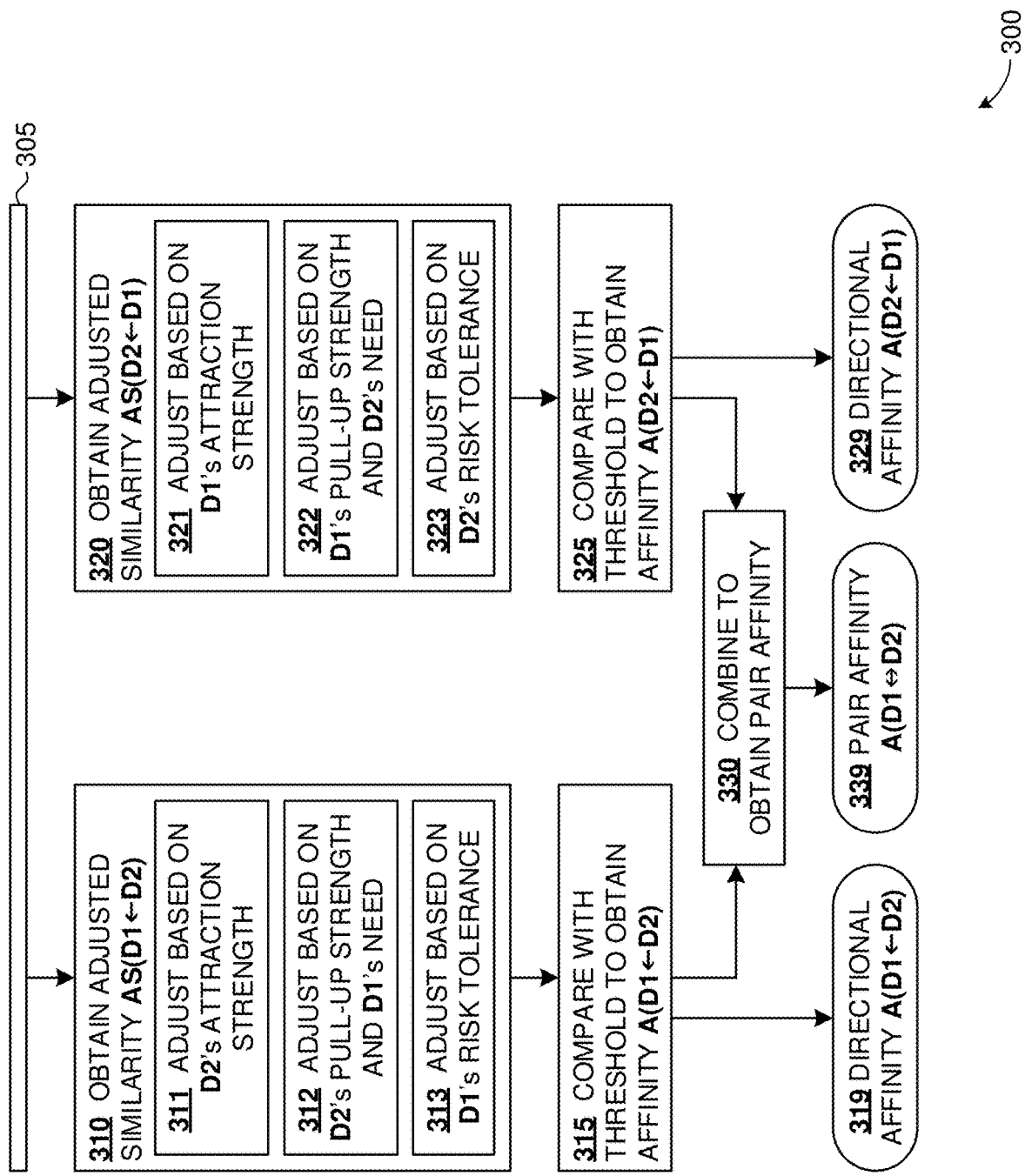
FIG. 3 is a partial flowchart of affinity determination according an example of the disclosed technologies.

FIG. 3 is a partial flowchart 300 depicting an example of affinity determination based on behavioral attributes. A profile similarity SP can be adjusted independently from the perspective of two devices D1, D2. Based on the adjusted similarities, both directional affinities and pair affinity can be determined.

The flowchart 300 begins at fork 305, with profile similarity SP already determined. The left fork, from the perspective of device D1 is described in detail; the right fork from the perspective of device D2 can be complementary.

At process block 310, profile similarity SP can be adjusted based on behavioral attributes to obtain adjusted similarity AS(D1←D2). At process block 315, a comparison of the adjusted similarity AS with a threshold T can yield the directional affinity A(D1←D2), which can be provided as an output at block 319.

Turning back to block 310, three examples of behavioral adjustment are provided for purpose of illustration. Various deployments of the disclosed technology can employ varying behavioral adjustments; fewer or more than three adjustments can be employed.

Block 311 describes an attraction effect, dependent on the behavioral attribute of attraction of the potential partner device D2. That is, if device D2 has a high degree of attraction (which in turn can be based on D2's principal attribute of Agreeableness), then device D1 can be more attracted to have affinity with device D2. The attraction effect thus can be dependent on a behavioral attribute of the partner device, not on a behavioral attribute of the instance device D1. Particularly, D1's own attribute of Agreeableness (or its own behavioral attribute of attraction) can be immaterial to its assessment of device D2. The attraction effect can be implemented using a monotonic function of D2's attraction. For simple illustration, AS(D1←D2)=SP+ 0.1*ATTR(D2) can be used, where ATTR(D2) represents D2's degree of attraction. Of course, other formulae can also be used. In examples, a high degree of ATTR(D2) can cause AS to be increased, while a low degree of ATTR(D2) can cause AS to be decreased. In other examples, the attraction effect can be clipped, so that AS can only be adjusted upward, without any penalty for a poor attraction of device D2.

Block 312 describes a helpfulness effect, dependent on D1's own behavioral attribute of need, and prospective device D2's behavioral attribute of helpfulness. The behavioral attribute of helpfulness can be based on a principal attribute of conscientiousness, while the behavioral attribute of need can be dependent on an interaction attribute of Number of Active Connections. That is, a device with fewer connections than a target number can have a need for more connections. A device with high conscientiousness can exhibit a behavior of helping other devices that have need. Of course, if device D1 already has its target level of active connections, it may have no need, and D2's helpfulness can be moot. Thus, the helpfulness effect manifests itself based on attributes of both devices jointly. Expressed in words, an instant device D1 having need can have stronger affinity with a helpful device D2. For illustrative calculation, a formula such as AS(D1←D2)=SP+2*HELP(D2)*NEED (D1) can be used. Of course, other formulae can also be used.

Block 313 describes a risk tolerance effect, dependent on device D1's own risk tolerance. A device with high risk tolerance can have a lower threshold for finding affinity than other devices. Conversely, a device with low risk tolerance can have a higher threshold for finding affinity. The behavioral attribute of risk tolerance can be dependent on two principal attributes such as openness and neuroticism. Risk tolerance can be high when both openness is high and neuroticism is low, and can be low when either openness is low or neuroticism is high. As an alternative to lowering/raising the threshold, the similarity score SP can be raised/lowered instead. For illustration, a formula such as AS(D1←D2)=SP+RISK_TOL(D1) can be used.

The above cases illustrate behavioral effects dependent on a device's own behavioral attribute, on a partner device's behavioral attribute, or jointly on two different behavioral attributes of the two devices. For simplicity of illustration, additive formulae have been shown for each effect individually. The adjustments for each effect can be compounded or concatenated. Adjustments can be made through multiplicative or more complicated functional forms.

On the right fork of flowchart 300, blocks 320 (with its effects 321, 322, 323), 325, and output 329 can be similar to the left-hand blocks 310-319 discussed above, and are not further described. Turning to block 330, pair affinity of the devices D1, D2 can be determined based on the individual directional affinities A(D1←D2), A(D2←D1). The pair affinity can be provided as an output at block 339.

Numerous variations are possible. Different or different numbers of behavioral effects can be applied. One or more adjustments can equivalently be applied to the threshold rather than to the similarity SP. While in some examples, the pair affinity is based on an AND function, namely pair affinity requiring both directional affinities, this is not a requirement. In other examples, an OR function can be used, i.e. a single directional affinity can be sufficient. In further examples, pair affinity can be evaluated based on the adjusted similarities AS(D1←D2), AS(D2←D1), or their sum AS(D1←D2)+AS(D2←D1), so that a very strong adjusted similarity in one direction can compensate for an adjusted similarity in the other direction that is below threshold.

These and other behavioral effects can help avoid undesirable clustering, where only highly similar devices form connections. The attraction effect, the helpfulness effect, and the risk taking effect all provide mechanisms for dissimilar devices to find affinity and form connections. Accordingly, network coverage can be increased.

Influence of Behavior Effects

Figure 4:
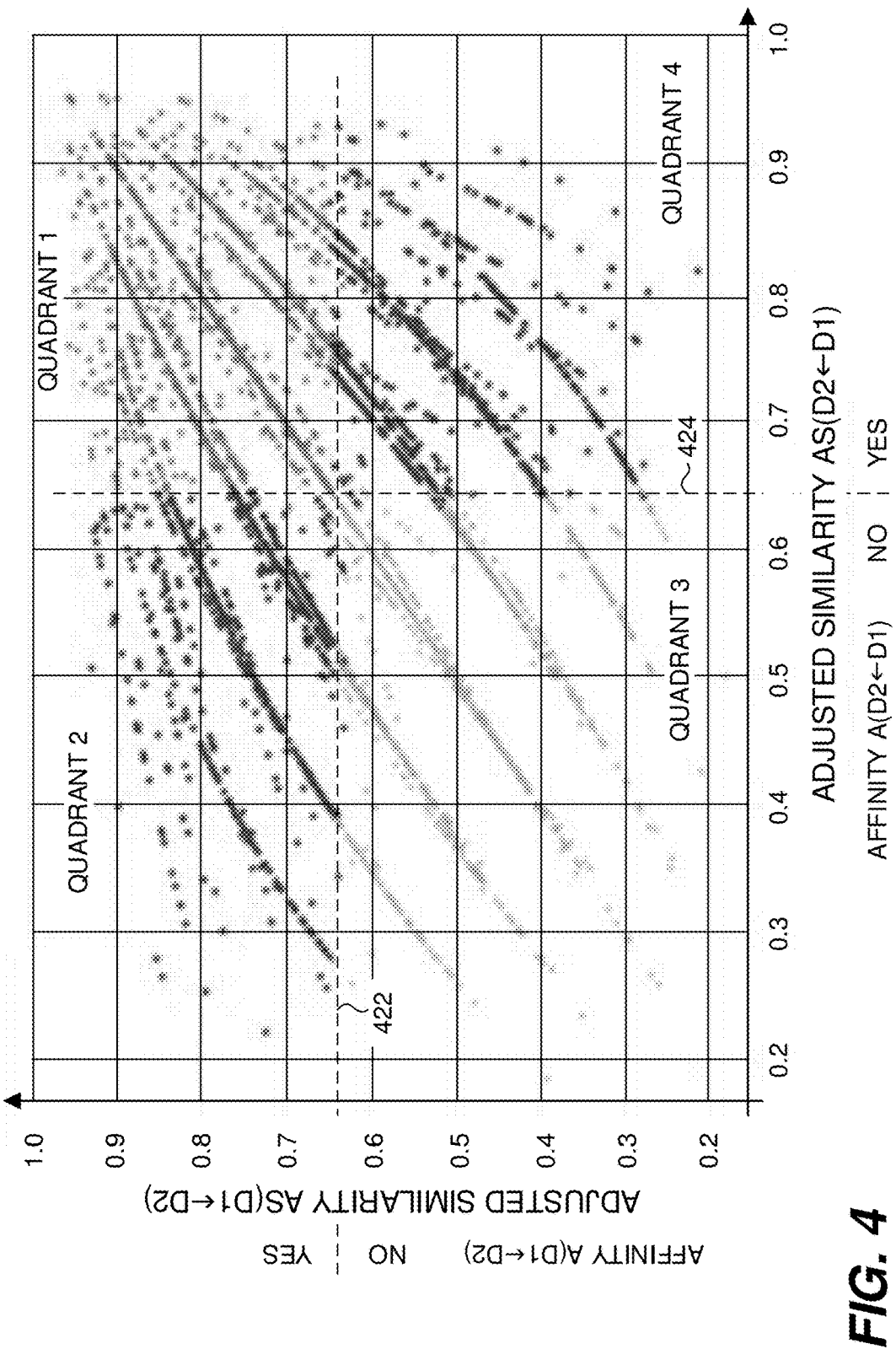
FIG. 4 is a chart illustrating the influence of behavioral effects on affinity determination according to an example of the disclosed technologies.

FIG. 4 is a chart 400 illustrating the influence of behavioral effects on affinity determination. A number of simulations were performed, initially without any behavioral effect, and then with varying amounts of behavioral effects. The adjusted similarities are plotted in chart 400 for all these simulations.

The illustrated data falls into bands. A central band illustrates the case with no behavioral effect. In this case, adjusted similarity is unchanged and AS=S for both devices D1, D2, which appears as a diagonal line y=x in the chart 400. Following this, the behavioral effects were increased in steps for one or both devices For some conditions, AS(D2←D1) was found to increase while AS(D1←D2) was found to decrease, resulting in bands below the diagonal, e.g. bands passing through quadrant 4. For other conditions, the converse was found and the bands are above the diagonal, e.g. bands passing through quadrant 2. Generally, a stronger behavioral effect can lead to a band displaced farther from the central y=x diagonal.

Also shown in FIG. 4 are dashed lines 422, 424 corresponding to threshold values (about 0.64) for each device. Where the adjusted similarity is below threshold, a device does not find affinity for the other device, while if the adjusted similarity is above threshold, affinity is found. The chart can be viewed as four quadrants. In quadrant 1, both devices find directional affinity, and as a result there is mutual affinity. In quadrant 3, neither device finds directional affinity, and as a result there is no affinity of any kind. In quadrants 2 or 4, one device finds affinity and one does not, and overall the result is directional affinity and, in some examples, a partial relationship as described herein.

Example Dataflow

Figure 5:
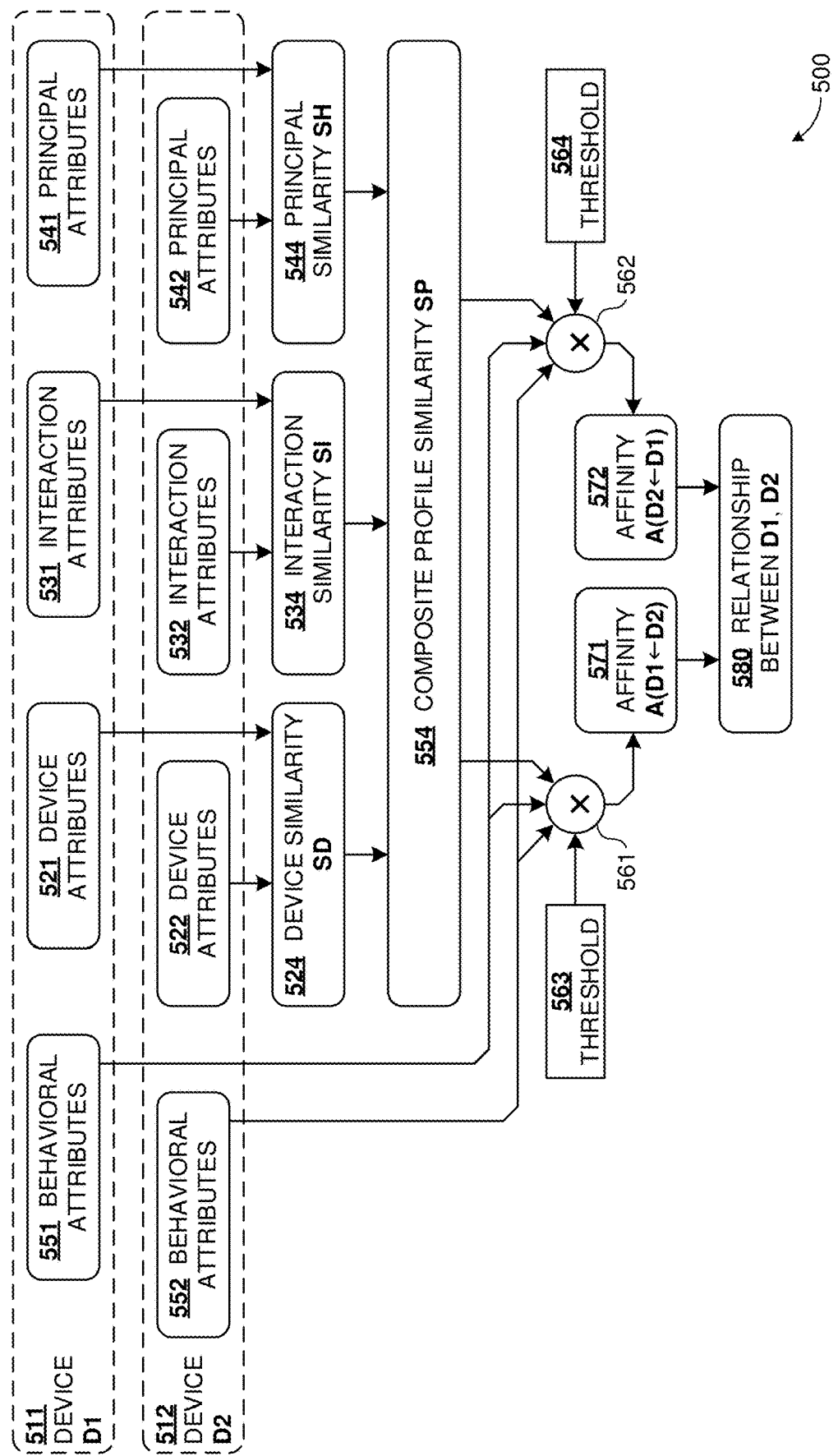
FIG. 5 is a dataflow diagram of an example method according to the disclosed technologies.

FIG. 5 is a dataflow diagram 500 illustrating an example method according to a dataflow perspective. Diagram 500 flows generally downward from device attributes near the top to a relationship between the devices at the bottom.

Attributes of devices D1, D2 are indicated within dashed lines 511, 512 respectively. These attributes include device attributes 521 (522), interaction attributes 531 (532), and principal attributes 541 (542) which are part of the respective device profiles of devices D1 (D2) as described herein. Additionally, each device can have respective behavioral attributes 551 (552) as described herein.

Using device attributes 521, 522 of the two devices, a device similarity 524 can be determined. Device similarity 524 (SD) is a partial similarity as described herein. Similarly, partial similarities 534 (interaction similarity SI) and 544 (principal similarity SH) can be evaluated, respectively based on the devices' interaction attributes 531, 532 and principal attributes 541, 542, as shown.

The partial similarities 524, 534, 544 can be combined to obtain a composite profile similarity (SP) 554 for devices D1, D2. The profile similarity 554 (SP) can be a single number, with no difference between the perspectives of device D1 or device D2.

Then, through further combination procedures 561, 562, the profile similarity 554, the devices' behavioral attributes 551, 552 and thresholds 563, 564 can be combined to obtain affinities 571, 572 representing directional affinities A(D1←D2), A(D2←D1) respectively. In some examples, combination procedure 562 can be implemented by adjusting the profile similarity 554 (SP) based on one or both of the behavioral attributes 551, 552, to obtain an adjusted (directional) similarity AS(D2←D1), which can be compared to threshold 564 to determine directional affinity 572. In other examples, the behavioral attributes 551, 552 can instead be applied to adjust threshold 563 instead, and the profile similarity 554 can be compared with the adjusted threshold to determine directional affinity A(D1←D2) 571.

Finally, the directional affinities 571, 572 can be combined to determine the relationship 580 between the devices. For example, if both directional affinities 571, 572 are present (true), then the relationship 580 can be a full sharing relationship. Otherwise if only one directional affinity, 571 or 572, is present, then the relationship 580 can be a restricted relationship, with limited sharing of information. For example, if only A(D1←D2) 571 is present, substantive information can be shared from D1 to D2, while only acknowledgments or status can be transmitted from device D2 to D1.

Numerous variations are possible. As described herein, the thresholds 563, 564 can be same or different; one or both can be attributes of devices D1 or D2. The device profiles can include more or fewer sections. Either behavioral attributes 551, 552 or principal attributes 541, 542 can be omitted, or only one of devices D1, D2 can have such attributes.

Example Sequence Diagram

Figure 6:
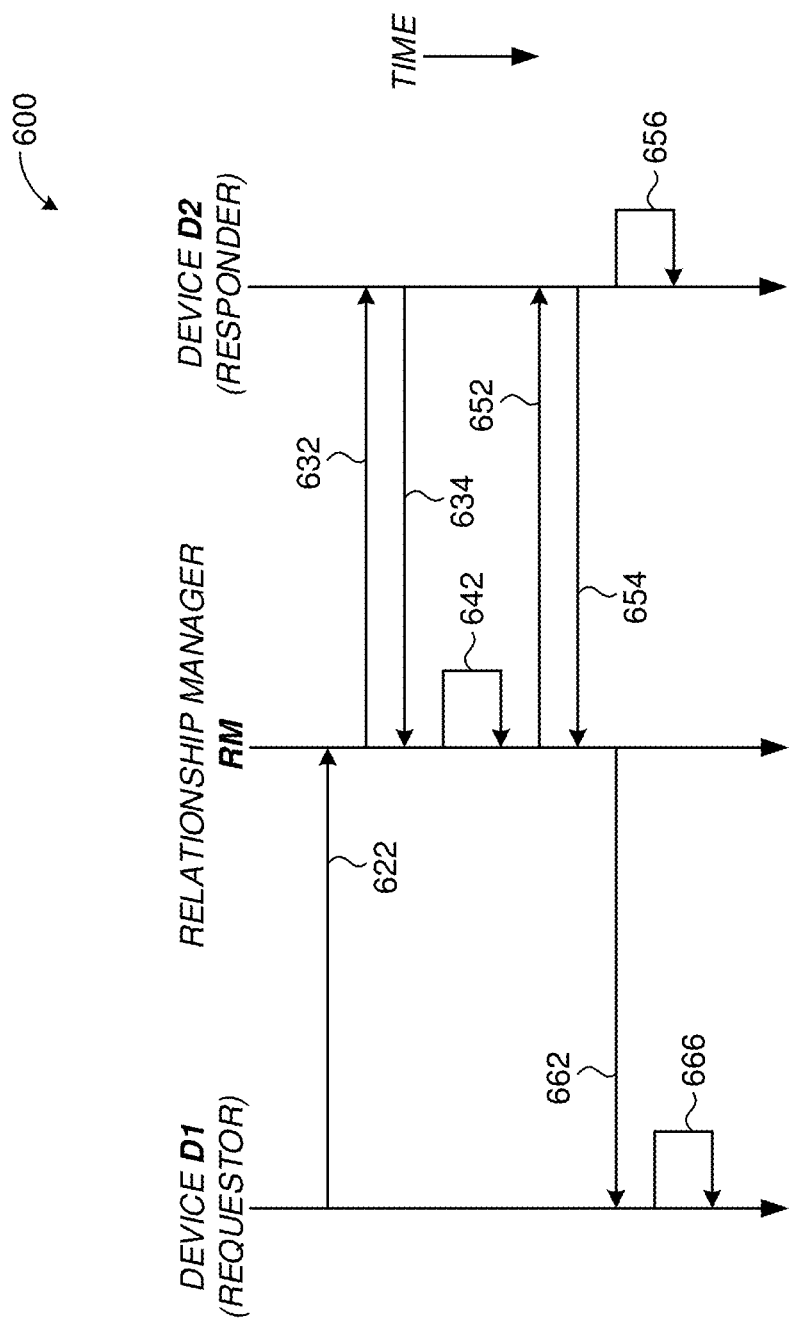
FIG. 6 is a sequence diagram of an example method according to the disclosed technologies.

FIG. 6 illustrates an example method as a sequence diagram 600. The method exchanges communication, determines affinity, and completes the establishment of a connection between a pair of devices D1, D2. Device D1 is shown as a requesting device, while device D2 is shown as a responding device.

Arrow 622 represents device D1 making a call to Relationship Manager (RM) requesting a partner to connect with. In examples, RM can be affiliated or part of a unique cell, shared among a group of cells, or can be a distributed service accessible to the requesting device D1. RM can have access to the profile of device D1 and also its behavioral attributes, if present. The device profile or behavioral attributes can be known by RM prior to the request 622, or can be provided or linked as part of the request 622.

RM can determine that device D2 is a candidate partner for device D1. This determination can be made in various ways. In some examples, candidate device D2 can be identified simply based on its being assigned to the same cell as requesting device D1. In other examples, candidate device D2 can be identified by a cell manager (CM) local to the cell, for example based on the proximity of devices D1, D2 within the cell. In further examples, candidate device D2 can be identified based on history of one or both devices. Devices D1, D2 could have had a connection previously, or could have narrowly missed forming a connection on a previous check for affinity. Or, device D2 could have a reputation for easily connecting to requesting devices. The determination of a candidate device can also be based on random selection or on a fairness strategy (e.g. round robin, or least-recently-used) among a pool of available devices. More than one candidate device D2 can be selected for the described method.

Arrow 632 represents a communication from RM to device D2 requesting its profile, and arrow 634 represents device D2 responding to RM with its profile. In certain situations, a device can decline the invitation of arrow 632, for example if device D2 has reached a limit on active connections. As shown, arrow 634 represents an affirmative response, and RM can proceed at arrow 642 to determine affinity between the devices D1, D2. In examples, the affinity determination can be similar to that described for other examples herein.

As illustrated, with a determination of affinity being present (full or partial), the method proceeds to establish a communication channel between the devices. Arrow 652 represents a request from RM to device D2 for a handle of a data communication channel, which also conveys to device D2 that affinity with device D1 has been found and a relationship or connection can be set up. Arrow 654 is the response from device D2 with the requested communication channel handle, which is relayed by RM to device D1 at arrow 662. Arrow 662 can also convey to device D1 that the affinity with device D2 has been found. With the relationship established, both devices D1, D2 can add each other to their list of communication partners, with appropriate connection channel information as indicated by arrows 666, 656 respectively.

Numerous variations are possible. Arrow 622 can be omitted, and the RM can select pairs of candidate devices for affinity testing. Affinity determination can be performed partly or wholly by the candidate devices rather than the RM. The communication channel can be conveyed from D1 to D2 rather than from D2 to D1.

Second Example Method

Figure 7:
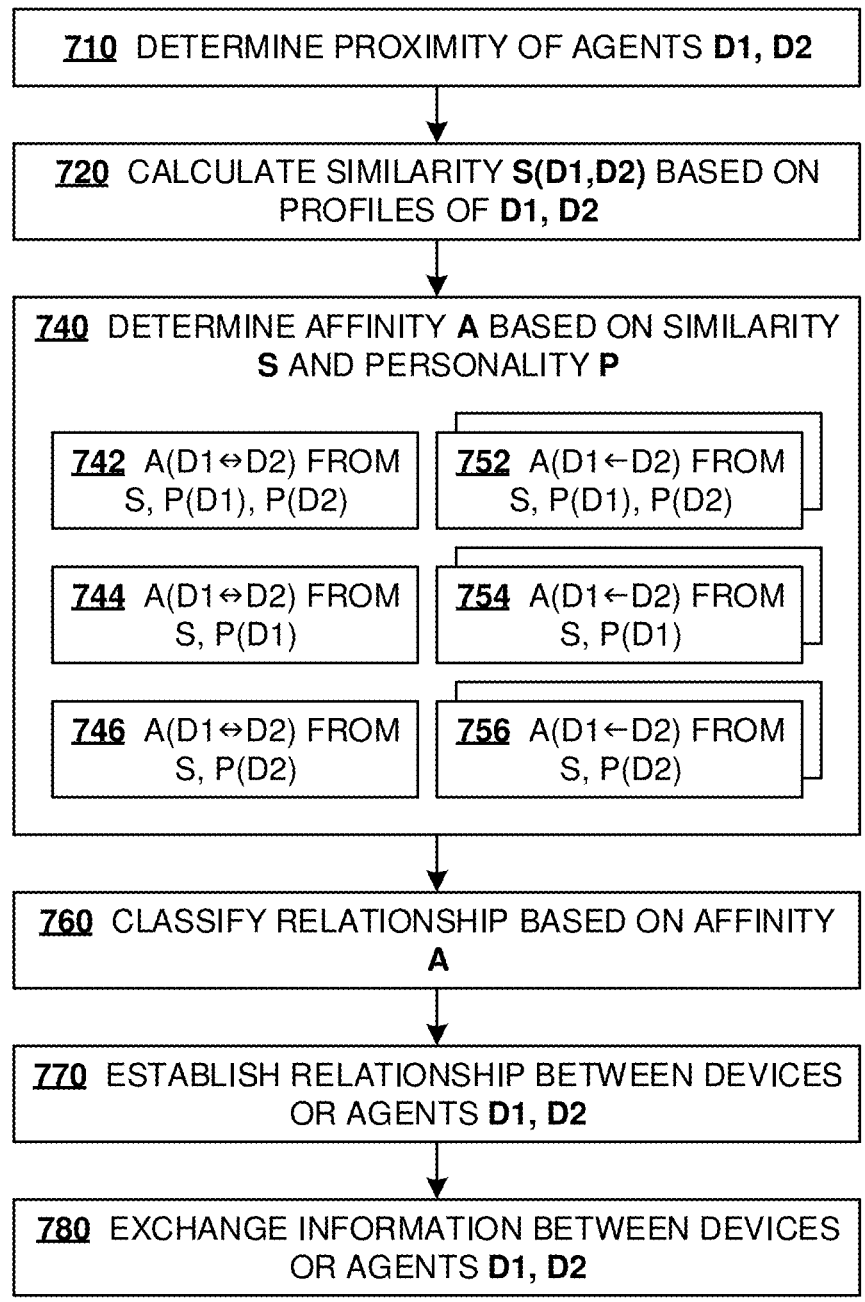
FIG. 7 is a flowchart of an example method according to the disclosed technologies.

FIG. 7 is a flowchart 700 of a method describing how two proximate device agents can establish a relationship and exchange information, according to an example of the disclosed technologies. The method evaluates similarity and affinity between the devices, using the device profiles and personalities of the devices as described herein.

At process block 710, two device agents of respective devices can be found to be proximate. Proximity can simply be on the basis of both device agents being assigned to a same cell, however this is not a requirement. At process block 720, a similarity S(D1,D2) for the two devices can be calculated based on profiles of the devices D1, D2. The similarity calculation can be similar to other similarity calculations described herein.

At process block 740, affinity A can be calculated based on the similarity S and one or both personalities P(D1), P(D2). Based on the affinity A, a relationship between the devices can be classified at process block 760. For example, if mutual affinity is determined, then the relationship between the devices can be classified as a full sharing relationship. If directional affinity is found, then the relationship can be classified as a partial sharing relationship. However, if affinity is not found, the relationship can be maintained at a default value of no sharing. The relationship can be established at process block 770, conforming with the classification, in at least cases of partial sharing or full sharing. Finally, with relationship established, information can be transmitted (shared) between devices D1, D2 in at least one direction as shown at process block 780. In the case of a full sharing relationship, information can be exchanged between the devices, in both directions.

Turning back to the determination of affinity at block 740, a number of cases are possible. The associated procedures are represented as sub-blocks 742-756. A given deployment of the disclosed technology can support any one or more of these procedures for determining affinity. Sub-blocks 742, 744, 746 depict procedures for determining bidirectional affinity A(D1↔D2), while sub-blocks 752, 754, 756 depict procedures for determining directional affinity A(D1←D2). Additional boxes shown as shadows behind sub-blocks 752, 754, 756 represent similar counterpart procedures for determining directional affinity A(D2←D1), which are not further described.

In sub-block 742, the bidirectional affinity A(D1↔D2) can be based on all of: the similarity S, the personality P(D1) of device D1, and the personality P(D2) of device D2. However, this is not a requirement. Sub-blocks 744, 746 illustrate cases where only one of the device personalities is used in the affinity calculation. Such cases could arise in examples where only one of the two devices D1, D2 has principal attributes, behavioral attributes, etc. An automobile could have such attributes acquired from its user (driver or occupant), while a nearby traffic signal could have no such attributes.

In sub-block 752, directional affinity A(D1←D2) can be based on all of: the similarity S, the personality P(D1) of device D1, and the personality P(D2) of device D2. However, this is not a requirement. Sub-blocks 754, 756 illustrate cases where only one of the device personalities is used in the affinity calculation. In examples with only one of the two devices being attribute-aware, directional affinity could be found from the perspective of either the attribute-aware device or the non-attribute-aware device.

Numerous variations of this method are possible. As described herein, a threshold can be used to determine affinity at process block 740. In some examples, the threshold can be implicit within the procedures 742-756, while in other examples the threshold can be an explicit parameter as described herein, either constant or varying, either global or specific to a cell. Each cell can have its own threshold, which can be calculated based on a history of interactions between devices in the cell. The threshold can evolve over time as devices migrate among cells, or via a learning procedure. In further examples, a threshold can be specific to a device, and can be included within the interaction attributes such as 220. That is, each device can evolve its own threshold based on its history of cell travel, based on interactions with other candidate devices (i.e. before forming a connection), or based on interaction with partner devices (i.e. after establishing a connection).

Third Example Method

Figure 8:
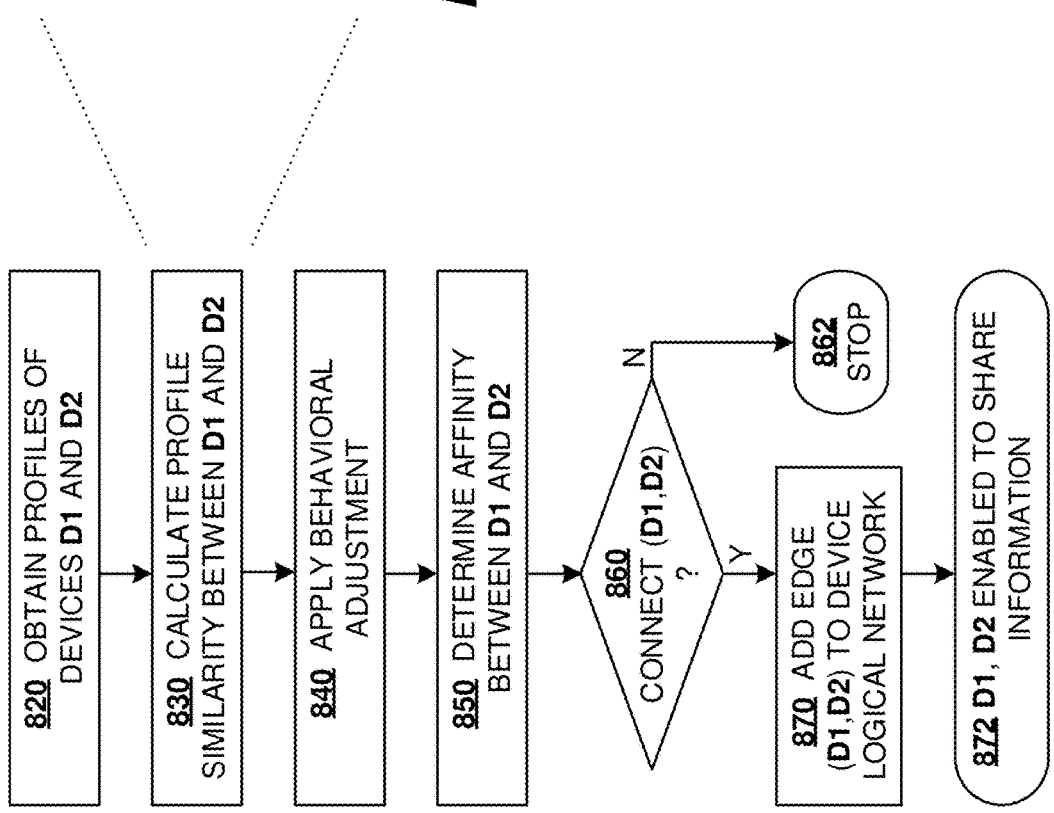
FIG. 8 is a flowchart of an example method according to the disclosed technologies.

FIG. 8 is a flowchart 800 of an example method according to the disclosed technologies. A similarity score between two devices can be adjusted before determining affinity between the devices and linking the devices in a logical network. The adjustment to the similarity score can reflect behavioral attribute.

At process block 820, the profiles of two devices D1, D2 can be obtained. The device profiles for the two devices can be used to calculate a similarity score at process block 830. Then at process block 840, a behavioral adjustment can be applied to the similarity score, based on one or more behavioral attributes of one or both of the devices. With the adjusted similarity score and a threshold value, the presence or absence of affinity between the devices can be determined at process block 850. A decision to connect the devices can be made at process block 860, based on the determined affinity. Absent affinity, the method follows the N branch to block 862 and can stop. However if affinity is present, then, responsive to the determined affinity, the devices can be logically connected by adding an edge to a logical network of devices at process block 870, the edge joining nodes of the logical network representing the nodes D1, D2 respectively. The method can terminate at block 872 with devices D1, D2 enabled to share information over their logical network connection.

Numerous variations of this method are possible. As described herein, the determination of affinity can be directional or bidirectional. A directional finding of affinity indicates that one of the devices has affinity determined for the other device, independent of whether the other device has affinity determined for the one device.

In some examples, a device profile can include principal attributes, which can be obtained based on input from a user of the device. In some of these examples, the user's input can be obtained directly by interrogation of the user over a user interface, such as by a questionnaire. The questionnaire can be static, or can be dynamically guided based on the user's previous responses. Interrogation can be performed directly by the device, or by a software or hardware agent representing the device. In other examples, the user's input can be provided over various forums and media, including social media, and can be analyzed by a service to determine the user's principal attributes, which can then be provided by the same or another service to the device. The principal attributes can reflect actual attributes of the user, but this is not a requirement. In further examples, the principal attributes can be programmed at discretion. For example, a strongly introverted person can adopt a more extroverted persona. Although the principal attributes have been described in the preceding lines as associated with a user of the device, similar techniques can be applied to other principals associated with the device.

Figure 9:
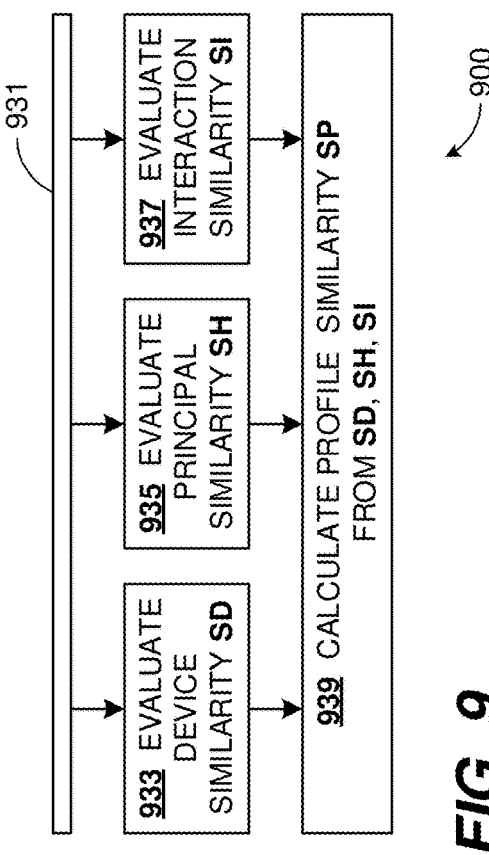
FIG. 9 is a partial flowchart of similarity calculation according an example of the disclosed technologies.

FIG. 9 is a partial flowchart 900 of an example similarity calculation incorporating anthropomorphic attributes. In this example, a similarity score can be calculated in parts which are then combined.

The method can fork at 931 into three parallel calculation tasks 933, 935, 937. Task 933 can evaluate a device similarity SD using the device attributes, as described herein. The device attributes can be viewed as a subspace of all the attributes in the device's profile. Task 935 can evaluate a principal similarity SH using the principal attributes described herein, which form another subspace in the device's profile. Task 937 can evaluate an interaction similarity SI using the interaction attributes described herein, which form a further subspace in the device's profile. Each of the partial similarities SD, SH, SI can be determined using cosine similarity, Jaccard similarity, or a distance measure (e.g. Euclidean, Manhattan, or Minkowski distance) in an artificial vector space formed by the various attributes of a respective group of attributes. Weights can be applied to respective attributes. Weights can be pre-defined, i.e. stipulated by design, or can evolve through a learning process. Weights can vary among areas, or among cells of a given area.

To illustrate, the subspace similarity SS (which can be SD, SH, or SI) can be calculated as a weighted cosine similarity:

$$SS(D1, D2) = \frac{\sum_i w_i \cdot a1_i \cdot a2_i}{\sqrt{\sum_i w_i \cdot a1_i^2} \sqrt{\sum_i w_i \cdot a2_i^2}}$$

where the attributes of the subspace are indexed by i; a1, a2 are the attributes of devices D1, D2 respectively; and w are weights.

Finally, at process block 939, the task outputs can be joined and the net similarity between the device profiles (that is profile similarity SP) can be calculated as a composite of the partial similarities SD, SH, SI. In some examples, the composite similarity can be the sum of the partial similarities or the product of the similarities. To illustrate, the profile similarity SP can be calculated as a weighted sum of the subspace similarities (e.g. SD, SH, and SI):

$$SP = \sum_j W_j \cdot SS_j \text{ where } \sum_j W_j = 1$$

where the subspaces are indexed by j and W are weights. Weights w or W can be predefined or can be learned over time.

Other compositing functions cf can be used, as SP=cf(SD, SH, SI). In some examples, the compositing function cf can have always positive or always non-negative partial derivatives ∂SP/∂SD, ∂SP/∂SH, ∂SP/∂SI for all valid values of (SD, SH, SI). The profile similarity SP can be output for further use in the method of FIG. 8 or in another method described herein.

Although FIG. 9 illustrates three partial similarity scores being used, this is not a requirement. In varying examples, either fewer (1 or 2) or more (4, 5, 6, up to 10, 100, or even higher) partial similarity scores over respective attribute subspaces can be used.

Given the wide range of IoT device types, there can be a need to calculate similarity between dissimilar device types having different device profile structures. Specifically, a given attribute present in one of the device's profiles could be absent in the other device's profile. In varying examples, this can be handled by ignoring the given attribute, by using a default value for the missing given attribute, or by another means. Likewise, two devices can have different numbers of subspaces, and similar approaches can be used to handle such cases where a given subspace could be missing. Particularly, similarity can be calculated between an attribute-aware device profile and a device profile having no such attributes.

In further examples, devices could have differently organized attribute spaces. Such a situation can arise between old and new versions of device profiles, as deployments of disclosed technologies continue to evolve, and new devices and profiles can co-exist with legacy devices and profiles. Such a situation can also arise between two different manufacturers, or between local and foreign devices, as standards or units of measurement can vary between different parts of the world. For example, an American car taken to Germany could encounter a different IoT device profile standard. In such cases, a translation service can be invoked to transform one profile to conform with another, or a cross-similarity service can be invoked to directly calculate partial similarity scores between dissimilar profiles.

The use of partial similarity scores is not a requirement. In some examples, profile similarity SP can be calculated as a single task calculation across all attribute subspaces.

Figure 10:
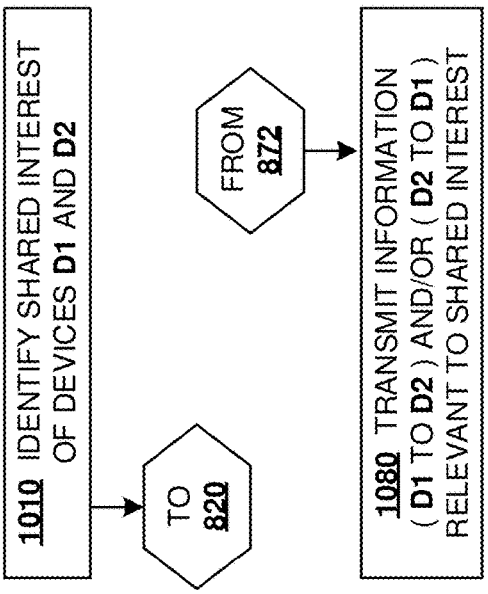
FIG. 10 is a partial flowchart integrating a shared interest into an example of the disclosed technologies.

As another variation, FIG. 10 is a partial flowchart 1000 showing integration of a shared interest into the method of FIG. 8. At process block 1010, devices D1, D2 can be found to have a shared interest, such as local temperature (e.g. at the devices' respective locations). The method can launch the method of FIG. 8 commencing at process block 820. Upon a determination of affinity and completion of flowchart 800 at block 872, the method can revert to flowchart 1000. At process block 1080, information relevant to the shared interest can be transmitted either from device D1 to device D2, or vice versa. Transmission in the opposite direction is neither required nor precluded. Thus, in the combination of FIG. 8 with FIG. 10, the affinity determination can be performed responsive to identification of a shared interest between the devices D1, D2.

Exchange of information between linked devices (e.g. subsequent to block 872) can be performed according to a response-request paradigm. Subsequent to connection of devices D1, D2 (e.g. at process block 870), a request from device D1 can be forwarded to device D2 over the logical network connection (network edge). A response to the request can be forwarded from device D2 to device D1.

Example Recommendation Method

Figure 11:
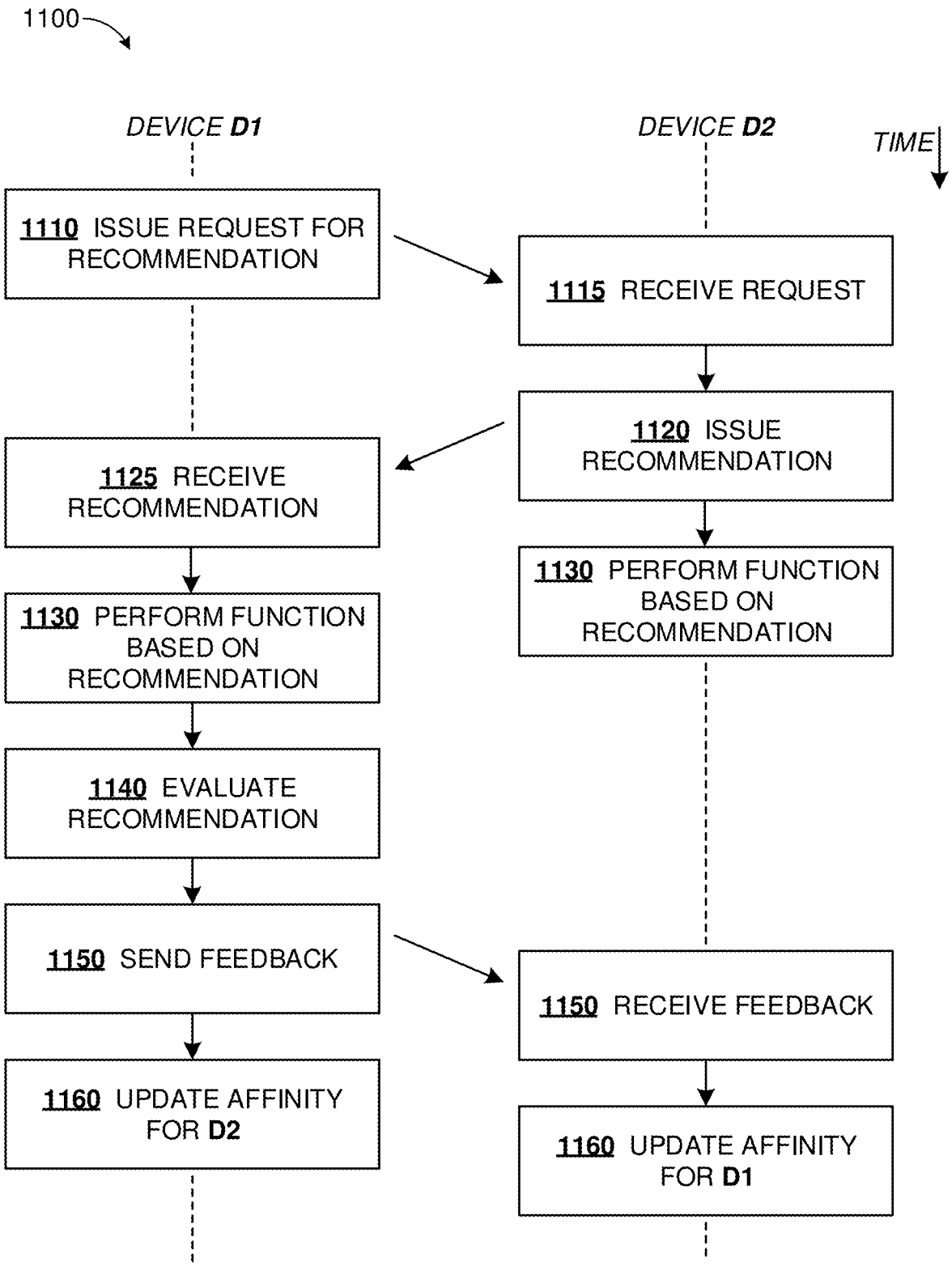
FIG. 11 is a flowchart of an example method according to the disclosed technologies.

FIG. 11 is a flowchart 1100 of an example method according to the disclosed technologies. A recommendation can be passed between two connected devices, and feedback can be provided. Flowchart 1100 is organized as two swim-lanes for devices D1, D2. As indicated, time generally proceeds downward.

At process block 1110, device D1 can issue a request for a recommendation to device D2 with which it has been connected as described herein. The request can be received by device D2 at block 1115. Having a suitable recommendation, device D2 can respond with the recommendation at block 1120. The recommendation can be received by device D1 at block 1125.

At block 1130, device D1 can use the recommendation to perform a suitable function. As an illustration, a refrigerator, having received a recommendation for a particular variety of milk, can place an order for that milk and provide that milk to its user. At block 1140, the recommendation can be evaluated, for example based on overt or implicit feedback from the user. Based on the evaluation, feedback can be sent to the recommending device D2 at block 1150. The feedback can be received by device D2 at block 1150. Based on the feedback, device D2 can update its affinity with device D1 at block 1160. Meanwhile, device D1 can also update its affinity for device D2 based on its evaluation. For example, a poor evaluation at block 1140 can cause device D1 to downgrade its affinity with D2. Mutual affinity A(D1↔D2) can be downgraded to affinity A(D2←D1) if affinity from the perspective of device D1 is lost. Conversely, favorable feedback received by device D2 can cause directional affinity A(D1←D2) to be upgraded to mutual affinity A(D1↔D2) if device D2 revises its appraisal of device D1 upward.

Numerous variations of this method are possible. Device D1 can issue requests for recommendation to multiple partner devices, and can select among recommendations received. The recommendation can be accompanied by a quality indicator signifying, for example, a strong or weak recommendation according to a predetermined scale. The illustrated method follows a request-response paradigm. Other paradigms can be used. Blocks 1110, 1115 can be omitted, and the recommendation can be sent from device D2 to connected device D1 as a push notification. In other examples, the recommendation or feedback can be mediated by a cell or other infrastructure node representing a shared interest, so that recommendations are managed by a cell. The cell can be configured to only forward recommendations to device D1 that originate from devices with which device D1 is connected. Evaluation of a recommendation can be incorporated into a reputation score; the reputation of a recommending device can be enhanced (reputation score increased) or degraded (decreased) according to evaluations of its recommendations.

First Example Use Case

Figure 12A:
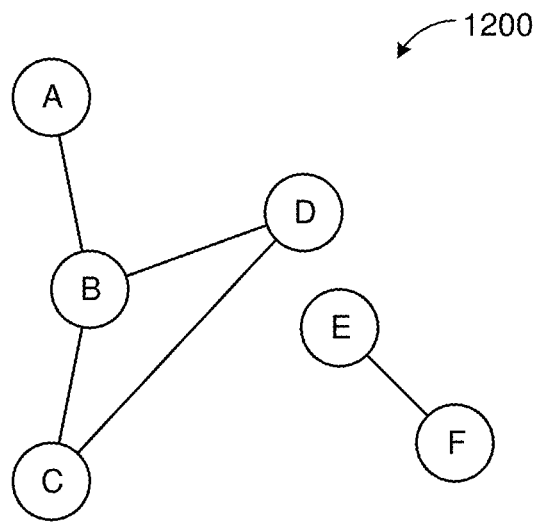
FIGS. 12A-12B are diagrams illustrating usage of an example logical network according to the disclosed technologies.
Figure 12B:
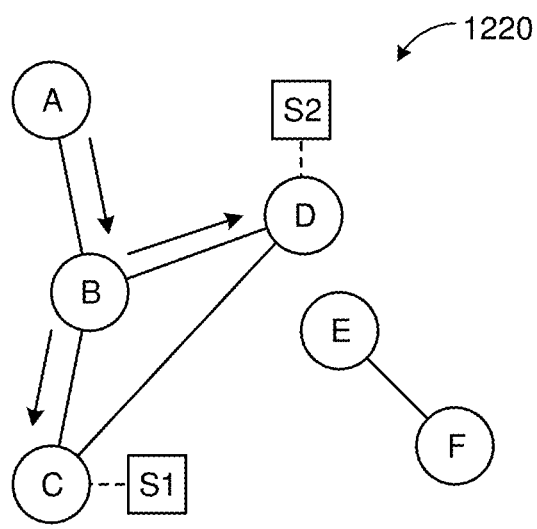

FIGS. 12A-12B are diagrams 1200, 1220 illustrating usage of an example logical network according to the disclosed technologies. FIG. 12A depicts a logical network of six devices A-F, formed through the operation of the disclosed technologies. There are two disjoint subnets, ABCD and EF, as shown. Subnet ABCD includes loop BCD. The groups BCD and EF are fully connected.

FIG. 12B illustrates some operations of the network 1200. Devices C, D can be configured to provide services S1, S2 respectively. Thus, when device B needs service S1, it can send requests to its partners A, C, D. C can respond affirmatively, and B can then access service S1 through device C. Thus, when device A issues a request for service S1, node B can readily reply with an indication that device C can provide this service. In varying examples, (a) A can request a connection with C to add an edge AC to the network, and then use C's service S1; (b) A can make an out-of-network request to C for service S1, i.e. without adding edge AC to the logical network; or (c) A can request the service S1 indirectly through B.

In another operation, device A can request service S2 from device B. In this example, B has not previously used service S2 and has no knowledge of it. In some examples, B can simply decline the request, while in other examples device B (which can be aware of A's Need, A having but a single partner) can exercise Helpfulness and forward the request to its own partners on A's behalf. Thus, B can receive an affirmative response from device D, and so discover that device D can provide service S2, which response can be forwarded back to the requesting device A. This example demonstrates how principal or behavioral attributes of devices A, B can continue to provide benefit after the logical device network 1200 has been built.

Numerous variations are possible. Node F could also request service S1. Upon finding that this service is unavailable through subnet EF, node F can travel to a cell X (not shown) having interest "S1." If device C is not presently assigned to cell X, node F can wait or periodically visit until device C (or another node in cell X having service S1) appears, request and form a connection with device C and thereafter avail of service S1 through its new connection with device C. In this example, the growth of logical network 1200 can be driven by a requirement of device F.

Second Example Use Case

Figure 13:
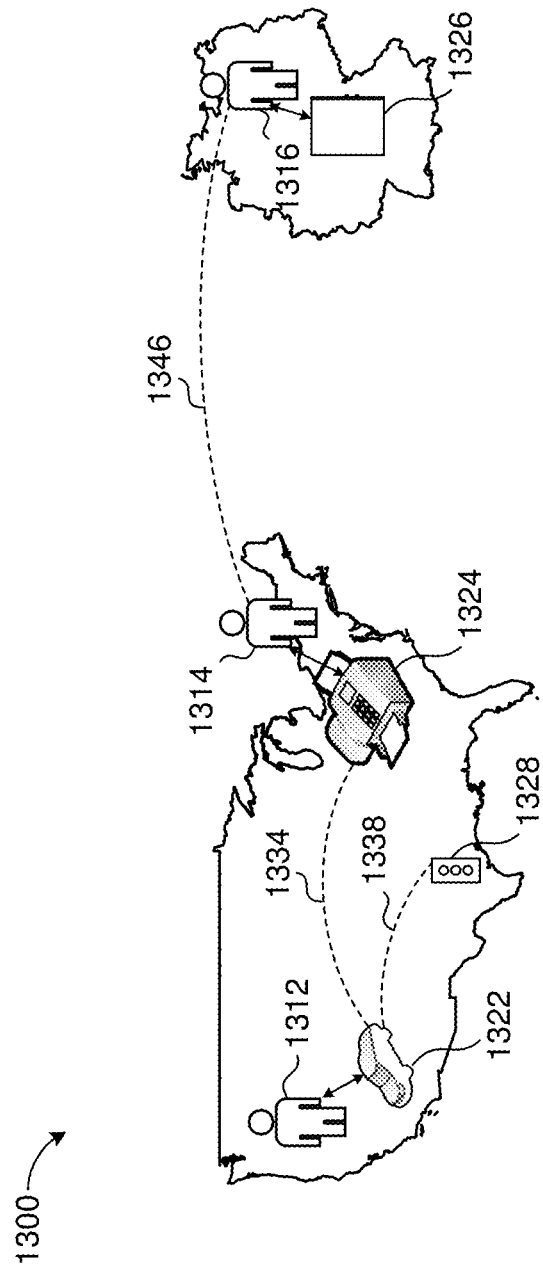
FIG. 13 is a diagram of an example use case according to the disclosed technologies.

FIG. 13 is a diagram 1300 of an example use case according to the disclosed technologies. In this example, users 1312, 1314, 1316 are respectively linked to the devices automobile 1322, FAX machine 1324, and refrigerator 1326, as shown by double-sided arrows. Users 1314, 1316 can be connected by a pre-existing social network link, but user 1312 has no social network connection with either of these users. User 1312 can plan a journey to various national parks, and automobile 1322 can be tasked with finding temperature, altitude, or road conditions at the parks. In the example, FAX machine 1324, at the National Park Service office in Washington D.C., has been in communication with various national park offices and has the appropriate phone numbers. Automobile 1322 and FAX machine 1324 are dissimilar remote devices, with no pre-existing connection through e.g. their users' social media. With the disclosed technology, devices 1322, 1324 could meet in a cell having interest "National Parks" and form a connection 1334, which could not be achieved through other techniques. Also illustrated in FIG. 13 is a logical device connection 1338 between automobile 1322 and a traffic light 1328 near Houston Tex. This connection was formed on a recent trip so that the traffic light 1328 could provide better service to the automobile 1322 by changing to green light promptly when no cross traffic is present. However, after some months of disuse, as automobile 1322 remains away from traffic light 1328, either one of the devices can terminate the connection 1338. As illustrated, traffic light 1328 has no principal. The connection 1338 illustrates that the disclosed technologies can be used to form connections between one device 1322 having principal attributes and another device 1328 having no principal attributes.

Numerous variations are possible. If a second automobile (not shown) connects with FAX machine 1324 for the National Parks interest, in some examples the FAX machine 1324 can recommend to both automobiles that they consider connecting to each other. The two automobiles can travel to a same cell and at least one can request a test for affinity with the other.

Additional Example Use Cases

The disclosed technologies can be applied in a wide range of scenarios.

Mixed Device Types

An appliance manufacturer can provision different device types, such as a refrigerator and a toaster, with the disclosed technologies. The refrigerator and toaster can be co-located in a home and have the same user as their principal. As the refrigerator tracks the user's habits regarding milk, the toaster can track the user's habits regarding bread. Affinity between these appliances, determined using the disclosed technologies, can lead to beneficial sharing of information. For example, the appliances could learn that the user's bread and milk consumption are inversely correlated. Accordingly, a drop in bread consumption could cause milk to be reordered sooner to ensure that sufficient milk is present to meet anticipated demand.

Fictitious Persona

Teams in an organization can place orders. Each team can be represented by a respective device agent having an assigned persona. A determination of affinity between two of these agents can lead to an agent-to-agent connection and beneficial sharing of information. A good experience of one team with vendor V1 can lead the other team to prefer vendor V1 for a subsequent purchase. The disclosed technologies can be used to find the best partner(s) for a given team's device agent, without supervision. In this example, the IoT technology can be deployed for device agents without any corresponding tangible device. A device agent can be or represent an avatar of a person, a group of people, or an organization.

In another example, an introverted user can assign a more extroverted personality to the user's devices to overcome weaknesses in the user's human social networks. In a further example, attributes of a sports car can reflect the sporty nature of the car rather than any attributes of its user. In this way, the sports car can forge connections with similar cars and receive suitable recommendations for e.g. bucket seats or stereo system from other sports cars rather than from economy cars or minivans.

Shared Devices

A refrigerator in a family home can have multiple users, with individualized preferences. Accordingly, the refrigerator can be supported by multiple device agents, one for each user. In some examples, the multiple device agents can be active concurrently, while in other examples, activation or selection of a given user's device agent or device profile can be made in order to obtain recommendations suitable for the given user.

Interactions with Non-Attribute-Aware Devices

Printers can form beneficial connections, e.g. to share experience or recommendation regarding ink cartridges. However, not all printers may be attribute-aware (i.e. having principal or behavioral attributes). A home printer can have attributes of a user, while a public kiosk printer can have device attributes and interaction attributes, but may not have any principal or principal attributes. The kiosk printer can still be included in the disclosed technologies. A similarity calculation between an attribute-aware device and a non-attribute-aware device can employ device similarity SD and interaction similarity SI, but can ignore principal similarity SH. Behavioral effects dependent on attributes of the attribute-aware device can still be considered in an affinity determination. For example, the home printer can have a high level of helpfulness while the kiosk printer has no partner devices and hence a need.

Example with Smart Speaker

A user can request a smart speaker to provide a vacation destination. The user's interests (e.g. reflected in Device Interests 1663 described herein) can indicate an interest in hiking in forested areas. Based on the interest, the smart speaker's device agent (e.g. Device Agent 1665) can travel to an appropriate cell and request affinity determination with other devices. As connections are established, the device agent can request and receive recommendations for the vacation destination. Multiple recommendations can be ranked according to e.g. strength of adjusted similarity with the recommender, recommender's reputation, or a strength of recommendation accompanying the recommendation. In an extension of this use case, the device agent can also request access to a service for booking a hotel accommodation, similar to that described in context of FIG. 12B.

Example for Human Resources

A human resources department can post two new positions for employment, providing device agents with fictitious personas and principal attributes matching the desired characteristics, including personality attributes (e.g. strong extrovert) or work experience attributes (e.g. strong experience in ABAP and Java). A candidate can have a device agent (either an avatar for the person, or a device agent of one of the person's devices) to be matched against the posted positions in an appropriate cell. Candidates having adjusted similarity scores above a threshold can determine affinity and can be connected to the employment positions' agents. Through such connections, the human resource department can contact such candidates e.g. for an interview. Alternatively, candidates can use the connections to contact the human resources department and apply for the position(s). In environments having strong data privacy regulations, the affinity determination can be performed at a computing device controlled by the candidate person, to avoid sharing the candidate's personal information with the human resources department. Because the posted positions are not actual people, privacy considerations do not apply to dissemination of the positions' profiles. The disclosed technologies can supplant purpose-built job portals and many other meeting place websites.

Example Network Layers

Figure 14:
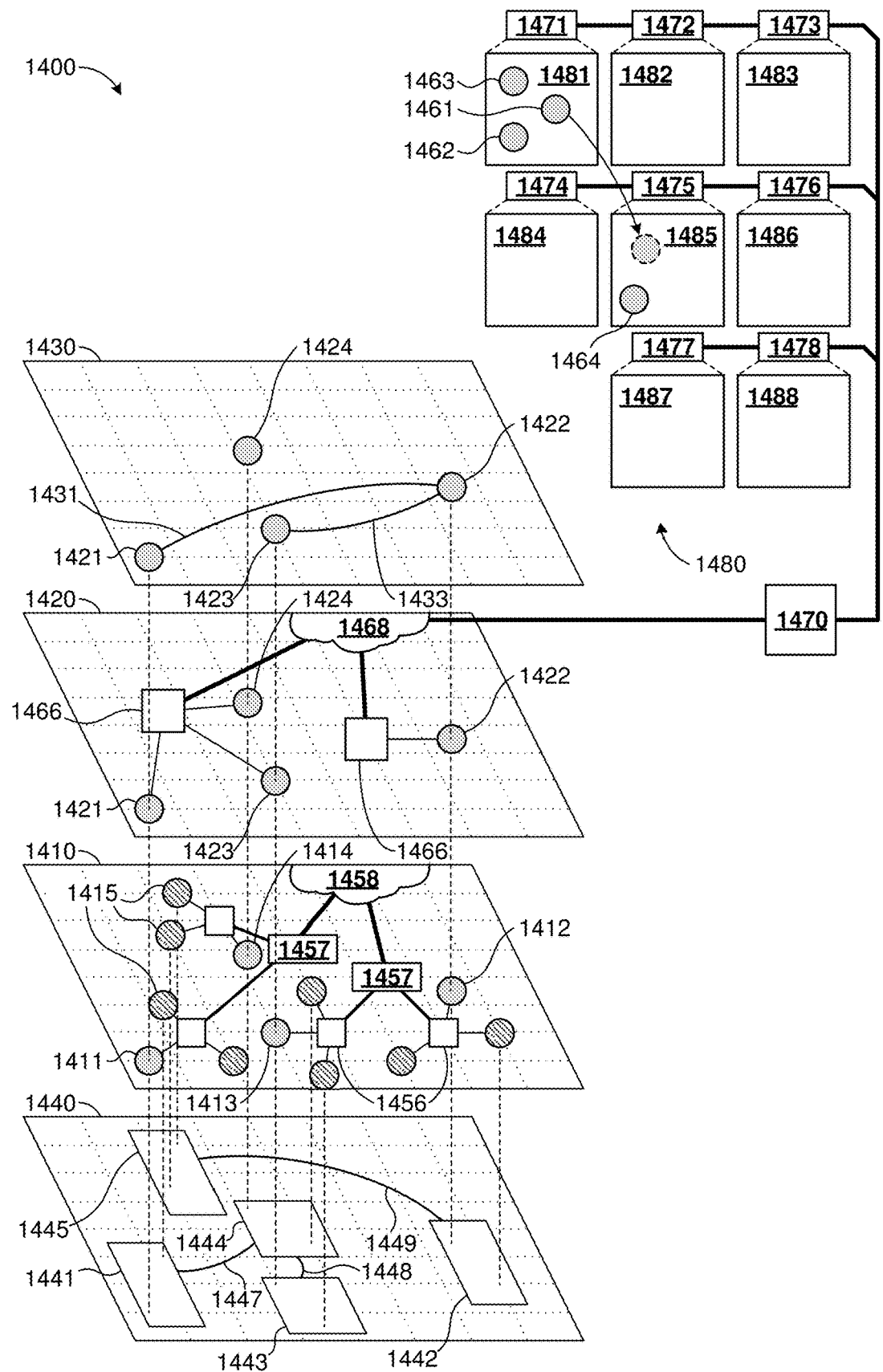
FIG. 14 is a diagram illustrating network layers associated with an example deployment of the disclosed technologies.

FIG. 14 is a diagram 1400 illustrating network layers associated with an example attribute-aware Internet of Things architecture according to the disclosed technology. Four planes 1410, 1420, 1430, 1440 are depicted, along with a cell farm 1480. Represented in diagram 1400 are various devices, agents, principals, and network infrastructure. Related entities are shown joined by dashed lines between planes.

On physical plane 1410, several Internet of Things (IoT) devices 1411-1415 are shown as circles, together with their connections via network infrastructure 1456, 1457 (shown as squares and rectangles) to a larger network, cloud, or internet 1458. In examples, devices 1456 can be access points or local routers, and devices 1457 can be points-of-presence (PoPs). The physical connections (straight solid lines) among these devices can be implemented as a network cable, network-over-powerline, wireless links, optical fiber links, or other networking technologies, in any combination.

On infrastructure plane 1420, agents 1421-1424, respectively associated with devices 1411-1414, are shown connected via service infrastructure devices 1466 to a wider network 1468. In examples, a service infrastructure device 1466 can be a server and can be configured to receive requests from associated device agents 1421-1424. Service infrastructure devices 1466 can provide distributed, scalable, edge service to device agents 1421-1424. Through connectivity on plane 1420, the device agents 1421-1424 can be connected to cell farm 1480 in order to avail of features of an attribute-aware internet of things architecture as disclosed herein. For example, devices 1411, 1413, 1414 located in Germany can have agents 1421, 1423, 1424 served by a server 1466 in Frankfurt, while device 1412 located in Great Britain can have its agent 1422 served by a server 1466 in London. The connections (straight lines) shown in plane 1420 can be logical connections implemented over an underlying physical network similar to that partly shown in plane 1410. In some examples, any of the device agents 1421-1424 can be implemented on the associated devices 1411-1414, while in other examples, an associated device 1411-1414 can have limited computing power or battery power, and any of the device agents 1421-1424 can be implemented away from the device. In examples, device agents can be implemented on a smartphone, on a local computer, on a service provider's computer, or in the cloud. Each agent can act as a proxy for its underlying device.

Logical network plane 1430 illustrates a logical network of interconnected IoT device agents 1421-1424. For example, through determination of affinity, a connection can be formed between agents 1421, 1422, representing an equivalent connection between the underlying devices 1411, 1412. Due to lack of affinity, agents 1421, 1423 can be left without a direct connection, however these agents 1421, 1423 can have an indirect connection through mutual partner device agent 1422. In examples, agents 1423, 1424 can be unconnected because they have not have been tested for affinity. Directly connected devices 1421, 1423 can interact, through a symmetric or asymmetric relationship, to receive recommendations and other services provided within the attribute-aware Internet of Things architecture. Inasmuch as the device agents are proxies for their respective IoT devices, the logical network shown in plane 1430 can be described as a logical network of device agents, or as a logical network of devices, interchangeably.

Principal plane 1440 illustrates logical connectivity between principals 1441-1445 of the devices 1411-1415. Relationships between devices and their principals is indicated by vertical dashed lines between planes 1410, 1440. A principal can be a user or owner of a device, or can be another entity having a relationship with the device. A principal can be a person, an organizational entity, a computer, or a machine. Some attributes of devices and their agents can be derived from their principals, as described herein. Although each device 1411-1415 in plane 1410 is shown having a single principal 1441-1445 in plane 1440, this is not a requirement. In examples, some devices can have multiple principals, while other devices can lack any principal. Within plane 1440, logical connections 1447-1449 between principals 1441-1445 are represented as curved lines. For example, principals in a business environment can be departments of a business, having connections determined by the organizational structure of the business. In other examples, principals in a personal environment can be individual humans, having connections according to a social network.

It can be seen that logical network of plane 1430 includes connections 1431, 1433 that could not be formed within the limitations of principal connectivity on plane 1440, because principal 1442 (for device 1412) is disjoint from principals 1441, 1443 (for devices 1411, 1413 respectively) in plane 1440. As disclosed herein, the attribute-aware Internet of Things architecture can provide a powerful technology for making high quality connections between devices or their agents, without artificial constraints of the physical networks or the principals. In turn, the logical network of plane 1440 enables efficient provision of services beyond the capabilities of conventional technology.

Cell farm 1480 can provide a scalable set of cells 1481-1488, each cell being a virtual meeting area for device agents. In the example illustrated, each cell 1481-1488 is implemented on an associated server 1471-1478, which can be real or virtual processing systems hosted in a compute cluster, a data center, or in the cloud. Cell router 1470 can serve to direct device agents 1421-1424 to or among cells 1481-1488. As illustrated, device agents 1421-1423 have been routed to cell 1481 implemented on server 1471, where their respective images or profiles 1461-1463 have been placed. Within cell 1481, server 1471 can scan the resident device agents (images) present to determine pairwise affinity (or lack thereof) between the corresponding devices or agents. As illustrated, affinity between agents 1422, 1423 (represented by their images 1462, 1463) can lead to the formation of logical connection 1433 in plane 1430, and similarly for logical connection 1431. Device agents can be allocated among cells according to interests. A single device agent can have multiple interests and can thereby be suitably assigned to any of several cells. In examples, device agents can migrate between cells. As shown, image 1461 of agent 1421 can move from cell 1481 to cell 1485. In cell 1485, server 1475 can make a determination as to affinity between agent 1421 and agent 1424 (represented by its image 1464). Over time the connectivity in plane 1430 can build up in a controlled manner, as device agents migrate among cells, interacting with other device agents and finding affinities. Connections 1431, 1433 can outlive the cell assignments of the linked agents. That is, migration of agent 1421 from cell 1481 to cell 1485 can leave link 1431 intact. However, over time, connections can also be removed: as devices go out of service, as interests change, as a given connection is found not to lead to successful service, or simply by selective or random pruning of the logical network of plane 1430.

Example Method for Building a Logical Network

Figure 15:
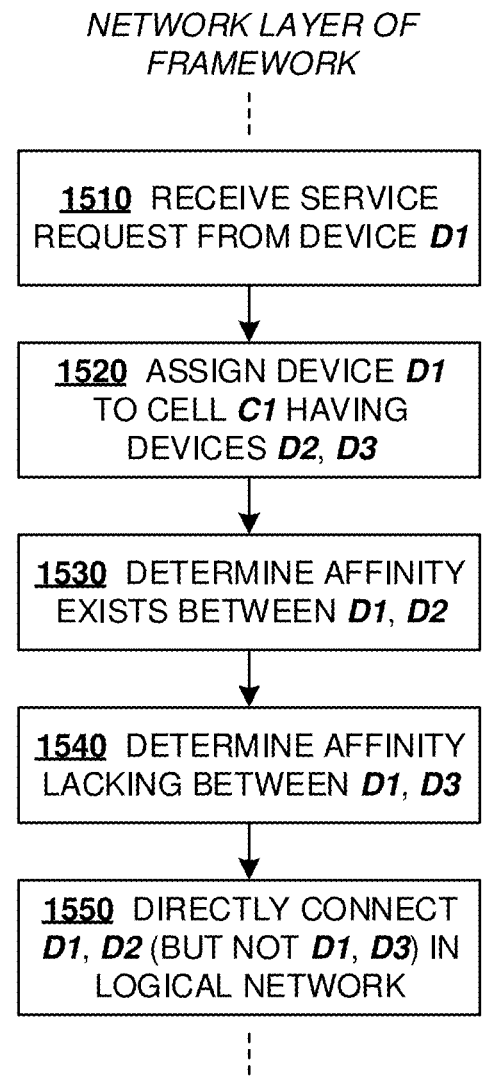
FIG. 15 is a flowchart of an example method for building a logical network according to the disclosed technologies.

FIG. 15 is a flowchart 1500 of an example method for building a logical network among devices, according to the disclosed technology. The method can be performed within a network layer of a framework as described herein. With reference to FIG. 14, the network layer can be implemented in plane 1420, cell router 1470, and cell farm 1480.

At process block 1510, a service request is received from a device D1 (e.g. device 1411 or its agent 1421). At process block 1520, device D1 can be assigned to a cell C1 (e.g. cell 1481), to which devices D2, D3 (e.g. device agents 1422, 1423) have already been assigned. At process block 1530, affinity between devices D1, D2 can be determined, for example by server 1471 hosting cell 1481. At process block 1540, lack of affinity between devices D1, D3 can be determined. Finally, based on the determined affinity, a direct logical network connection (e.g. 1431) can be made between device agents (e.g. 1421, 1422) at process block 1550.

Example Framework

Figure 16A:
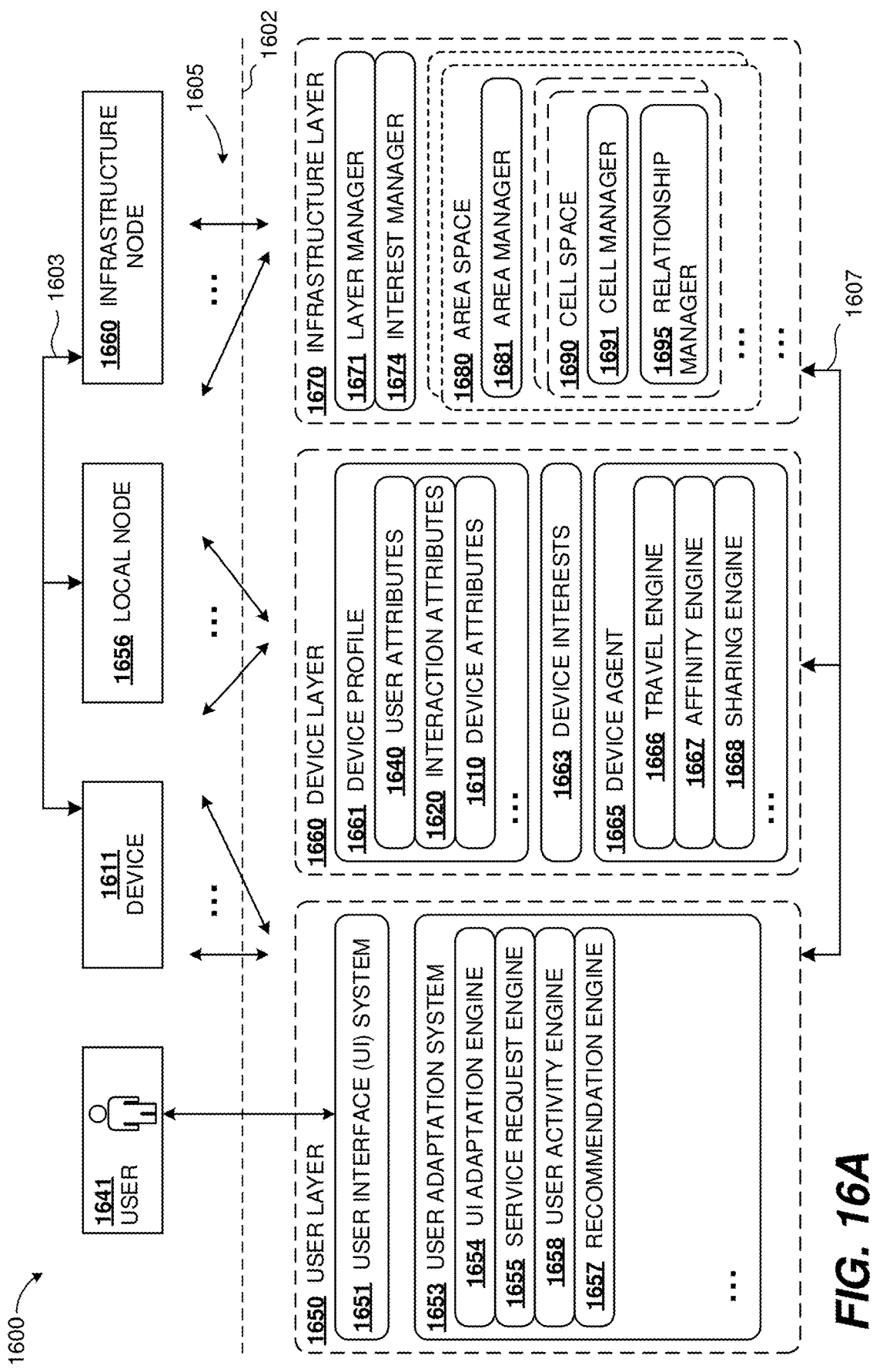
FIGS. 16A-16B are diagrams illustrating an example software framework and its interactions with an environment, according to the disclosed technologies.
Figure 16B:
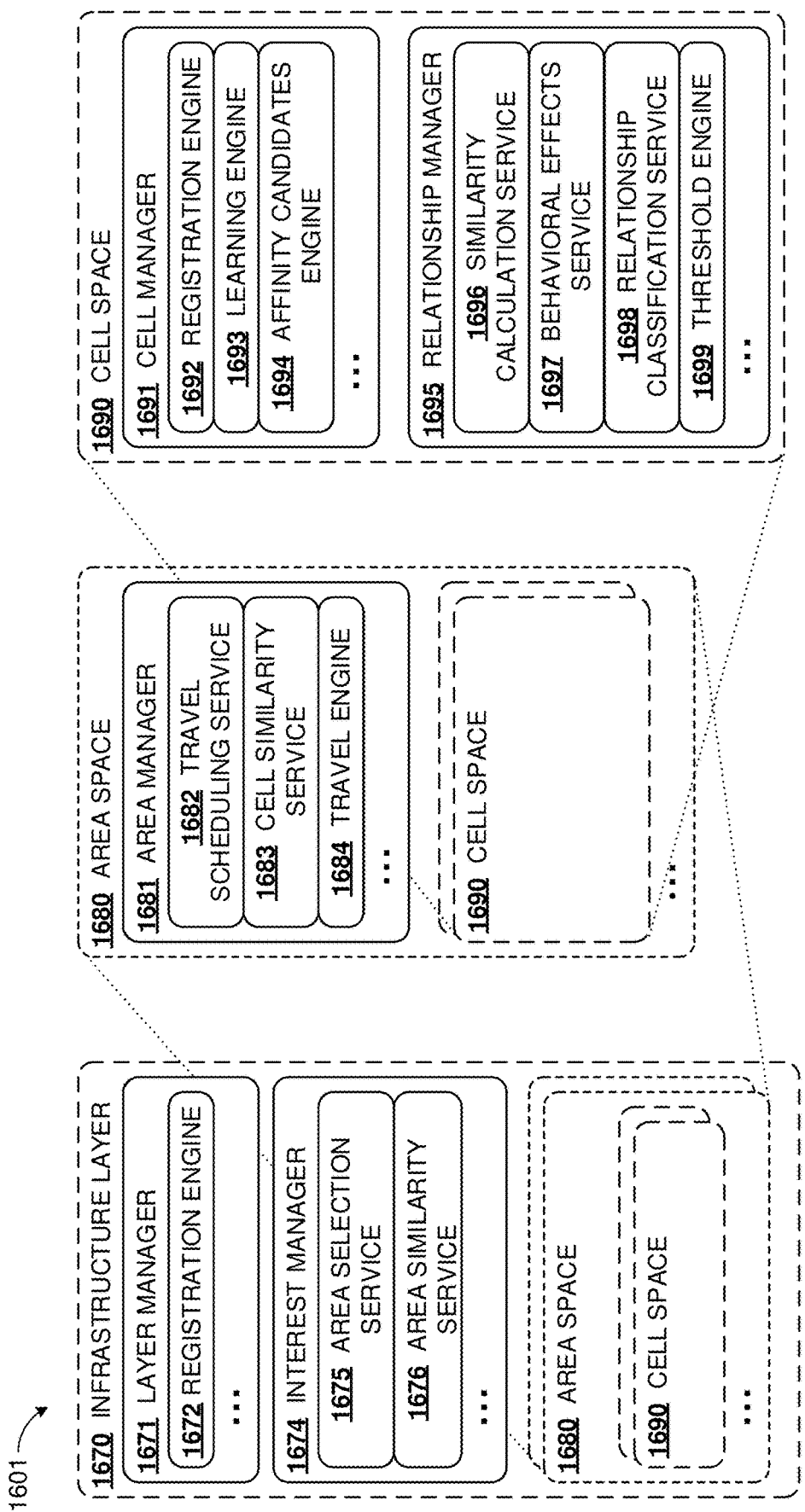

FIGS. 16A-16B are diagrams 1600, 1601 illustrating an example software framework and its interactions with an environment, according to the disclosed technologies. The framework can be organized into layers such as a User Layer 1650, Device Layer 1660, and Infrastructure Layer 1670. In diagram 1600, a dashed line 1602 separates the framework layers 1650, 1660, 1670 from tangible entities such as user 1641, device 1611, local computing node 1656, and infrastructure computing node 1660. The executing software of the example framework can be variously described as systems, managers, agents, engines, or services. The executing software can be supported by relevant temporary or persistent data. Certain data objects relevant to the disclosed technologies include Device Profile 1661 and Device Interests 1663. "Layers" and "spaces" are provided as conceptual aids and need not provide any specific software functionality beyond that of their included software entities. However, as indicated by various " . . . " symbols, each of the layers, spaces, systems, managers, etc. can include additional software components beyond those illustrated. Layers 1650, 1660, 1670 can be communicatively coupled as indicated by arrows 1607.

User Layer

A user 1641 can communicate with the framework through a user interface. (UI) provided UI system 1651. The UI can be of any type, such as a screen on a physical object (e.g., smart TV display), a UI on the smart phone, computer, or a voice-based device (e.g., smart speaker or home assistant). A User Adaptation system 1653 can evaluate data collected from a device against the subjective preferences or acquired knowledge of user 1641. A UI Adaptation Engine 1654 can configure the level and the presentation of information for the UI, and can collect feedback from the user 1641. A Service Request Engine 1655 can be triggered by a request based on an interest (e.g., user 1641 desires a movie recommendation) together with the user's preferences (e.g. genre of action movie, or a pattern of watching TV at 8 p.m.). A User Activity Engine 1658 can monitor or record the interaction data between a device (e.g., smart TV) and user 1641. By using machine learning algorithms, engine 1658 can generate semantic patterns, e.g., the user 1641 watches an action movie on 60% of weekend evenings at 8 p.m., or at 6 a.m. the user 1641 always watches news on weekdays, that can be used to develop the understanding regarding the user's preferences and enhance the value of information that is shared in the form of a recommendation. As disclosed herein, recommendations can be shared among connected devices having affinity. A Recommendation Engine 1657 can rank recommendations received from other devices, e.g. by mapping interaction data from previous experiences (user 1641 changed channels after 10 minutes; or user 1641 provided feedback indicating an excellent experience) to specific sources of recommendations.

Software components of the User Layer 1650 can variously be hosted on the device (particularly for a device such as a smart TV or smart speaker having an integrated UI), on a local computing node (such as a home automation assistant or a smartphone), or on a remote compute node which can be part of the infrastructure for the disclosed technologies. Particularly, different components of the User Layer 1650 can be hosted on different compute devices.

Device Layer

A device 1611 (e.g. smart TV, or refrigerator) can have a Device Profile 1661, a collection of data which can include Device Attributes 1610, User Attributes 1640, or Interaction Attributes 1620 as described herein. Device Attributes 1610 can describe specifications or properties of the device 1611 using various static attributes that can relate to the particular device 1611 independent of its user or interactions. The Interaction Attributes 1620 can describe the data that are generated through the experience of device 1611 in a logical device network over all or part of the lifetime of device 1611. User Attributes 1640 can include principal attributes of the user 1641 (or other principal associated with device 1611), such as age, gender, personality, cognitive, emotional, perceptual, preferences, personality, or other attributes. These attributes can be acquired from user 1641 during an initialization stage and can be dynamically maintained (accommodating any changes either specified by the user 1641 or learned from the behavior of user 1641).

A device 1611 can also have Device Interests 1663, which are data items representing interests of the user 1641, or interests associated with inherent functions properties of device 1611. Interests can be broad (e.g. "movies") or narrow (e.g. "Lord of the Rings") and can evolve over time. Changes to Device Interests 1663 can occur through: receiving new user requests (add an interest); finding no relevant user requests over a predetermined time period (delete an interest); or receiving feedback from the infrastructure layer. For example, a device 1611 having interest "movies" could be offered a selection of movie genres (e.g. "action movies," "cartoons," or "romantic comedies") as interests supported by the infrastructure, and could replace "movies" with one or more of the offered genres. As another example, a device 1611 with an interest "lawn sprinkler" could be notified that it was mapped to a cell for interest "lawn irrigation" and then update its Device Interests 1663 to conform.

A Device Agent 1665 can use the data of Device Profile 1661 and Device Interests 1663 to operate autonomously within the framework, interacting with other framework entities without continuous interaction or supervision from user 1641. However, Device Profile 1661 and Device Interests 1663 can be maintained and updated either periodically or on an event-driven basis. As described herein, through its Agent 1665, the device 1611 can "travel" to a cell 1690, find candidate devices with which to test affinity, and build relationships or connections upon determining affinity with partner devices. Particularly, cell assignment can be guided by Device Interests 1663, while determination of affinity can be guided by Device Profile 1661.

The Device Agent 1665 can include a Travel Engine 1666 to guide its movement among cells according to Device Interests 1663. Within a cell, the Device Agent 1665 can use an Affinity Engine 1667 to develop affinities and new connections with other devices, by requesting matches or responding to affinity-seeking requests. With connections established, the Device Agent 1665 can use a Sharing Engine 1668 to communicate with its partner devices over established connections. Some examples herein employ a request-response paradigm for communication, e.g. with one device requesting a recommendation and the other device providing an appropriate recommendation, however this is not a requirement, and other IoT paradigms can be used. For example, a weather station can use push notification to advise partner devices (with interest in "Rain") of rainfall activity. A Device Agent 1665 can include a distributed intelligence engine (not shown) to cooperate with other distributed intelligence engines of similar devices in a swarm or hive intelligence model.

The Device Agent 1665 can be the sole point of contact between a device 1611 and the infrastructure layer 1670 (similar to plane 1420). The Device Agent 1665 can be the sole point of contact between a device 1611 and other devices in a logical device network (such as plane 1430). Such compartmentalization can advantageous for security. However, in further examples, devices 1611 can also have communication with IoT devices even without the affinity-based logical connection and the infrastructure described herein. Such communication outside the logical device network (i.e. outside plane 1430) can be dubbed "out-of-band." For example, a security camera can have a hard-wired functional relationship with its system controller. In another example, node A in FIG. 12 can use out-of-band communication to obtain service S2 from node D, even though in-band communication was used to find locate node D for node A.

Infrastructure Layer

An overview of the Infrastructure Layer 1670 is provided in diagram 1600, while further details are provided in diagram 1601. Infrastructure Layer 1670 can operate a virtual space organized hierarchically as areas 1680 and cells 1690, together with some common functions shown as a Layer Manager 1671 and an Interest Manager 1674. A plurality of areas 1680 correspond to respective interests, and within each area 1680 can be multiple cells 1690. The areas 1680 can provide a primary avenue for pruning search space for affinity. Although a single level of areas 1680 is illustrated, in some examples a hierarchical organization of the areas can be used for better efficiency and scaling.

The multiple Cells 1690 within a given Area 1680 can provide further improvement in scalability—assuming $N^2$ devices in an Area 1680, N cells having N devices each presents a total of $N^3$ pair combinations for possible affinity testing, while $N^2$ devices in a single cell presents a total of $N^4$ pair combinations for testing.

Turning to diagram 1601, the Infrastructure Layer 1670 and its constituent spaces are examined in turn. At the top level of Infrastructure Layer 1670, Layer Manager 1671 can include a Registration Engine 1672 configured to manage registration of Device Agents 1665 entering and leaving the framework. Interest Manager 1674 can provide the semantics for Device Agents 1665 to find the Area 1680 based on a given device interest (from Device Interests 1663). The Interest Manager 1674 can be aware of every Area 1680. Area Similarity Service 1676 can calculate a similarity between a device's interest (e.g. "Lord of the Rings") and an area interest (e.g. "hobbits"), for example using an ontology. Area Selection Service 1675 can select an Area 1680 for assigning a particular Device Agent 1665 for a particular interest. Inasmuch as Device Interests 1663 can include multiple interests, the Area Similarity Service 1676 and Area Selection Service 1675 can be used repeatedly to assign the Device Agent 1665. In some examples, Device Agents 1665 can concurrently be assigned to more than one Area 1680, while in other examples Device Agents 1665 can travel among areas, visiting one area at a time, to reduce computational burden and allocate infrastructure resources more fairly among both devices having few interests and devices having a large number of interests.

Arrows 1605 indicate that each of the layers can be implemented on or distributed among a variety of computing hardware, including the IoT device 1611, a local node 1656, or an infrastructure computing node 1660. The computing hardware 1611, 1656, 1660 can be communicatively coupled as indicated by arrows 1603. As an illustration, user layer 1650 for a home thermostat device 1611 can be implemented on the device itself, while device layer 1660 can be implemented on a home automation controller 1656 having greater computing power and communication capacity than the thermostat 1611. Infrastructure layer 1670 can be implemented among distributed infrastructure servers 1660 in the cloud.

Area Space

Inset 1680 in diagram 1601 provides further details of Area Space 1680. The Cells 1690 of a given Area 1680 can all have the same interest as Area 1680. Area Manager 1681 can include a Travel Scheduling Service 1682 to plan a travel schedule for Device Agent 1665 among the plurality of Cells 1690.

The Travel Scheduling Service 1682 can provide the semantics to find a suitable or optimal travel route for Device Agent 1665 among the Cells 1690 of Area 1680. In some examples, the cells 1690 can be spontaneous clustering sites of devices 1611 having similar profiles. Thus, in an Area 1680 for an interest "movies," a first cell 1690 can over time specialize in fans of action movies, while another cell can specialize in animated films. Each Cell 1690 can aggregate a history of previous affinity testing in that Cell 1690, and can develop a representative profile (dubbed a "proxy profile," optionally with weights for respective attributes) for its matched devices. A Cell Similarity Service 1683 can compare the Device Profile 1661 of an incoming Device Agent 1665 with these representative profiles to evaluate similarities ("cell similarity") between the Device Agent 1665 and the various Cells 1690. However, Interaction Attributes 1620 can be excluded from calculation of cell similarity to enable devices with different experience in the logical device network to come together in any give Cell 1690. The Travel Scheduling Service 1682 can route Device Agent 1665 among Cells 1690 based on the cells' respective cell similarity scores. In examples, a Device Agent 1665 can spend more/less time in a Cell 1690 according to whether the cell similarity is high/low.

Once planned, a travel schedule can be implemented by Travel Engine 1684 which can guide the Device Agent 1665 among the Cells 1690 by reassigning the Device Agent 1665 to successive Cells 1690 according to the travel schedule. In examples, a Device Agent 1665 can only be assigned to one Cell 1690 at a time, within a given Area 1680. The Travel Engine 1684 can be responsible for registration of the Device Agent 1665 in successive Cells 1690, e.g. by using the Cells' respective Registration Engines 1692, and can also ensure that the Device Agent 1665 is not concurrently registered in two Cells 1690 of Area 1680.

Cell Similarity Calculation

A user 1641 of a TV device 1611 can have an interest "movies" (in Device Interests 1663), and can also have a preference for e.g. an "action movie" genre. The preference can be stored as part of User Attributes 1640 but processed separately by the Cell Similarity Service 1683. An example of cell similarity CS calculation can be with a formula CS=K1*(W1*SU1+W2*SD)+K2*SU2, where SU1, SU2, SD are similarities between device and cell for User Attributes 1640 excluding preferences, preferences, and Device Attributes 1610 respectively. K1, K2, W1, W2 are weights, which can be constrained by K1+K2=1 and W1+W2=1. In other examples, where cells have coordinates in a virtual space, a geometric algorithm such as gradient descent can be used to identify a cell to which a device can be assigned. Weights can vary among areas, or among cells of a given area.

Cell Layer

Once registered to a Cell 1690, a Device Agent 1665 can request Affinity Candidates Engine 1694 to provide candidates for determining affinity. In some examples, the requests can be made with a randomized probability or randomized at an average rate predetermined for the requesting device, e.g. based on its extroversion or its need for additional partners. The candidates can be obtained from other devices presently assigned to the instant Cell 1690, and identifiers and profiles of the candidates can be forwarded to Relationship Manager 1695 (RM). RM 1695 can use Similarity Calculation Service 1696 to calculate the similarity metric between successive pairs of the requesting Device Agent 1665 and profiles of candidate devices present in the Cell 1690, as described herein.

Behavioral Effects Service 1697 can be used to apply behavioral effects as described herein, following which one or more of affinities A(D1←D2), A(D2←D1), A(D1↔D2) between a Device Agent 1665 (as device D1) and various candidate devices D2. Based on affinity, Relationship Classification Service can be used to classify a relationship between devices D1, D2, as described herein.

Device Similarity Calculation

An example calculation of similarity SP between profiles of two devices can use a formula SP=K1*(W1*SU1+ W2*SD+W3*SI)+K2*SU2, where SU1, SU2, SD, SI are similarities between device and cell for User Attributes 1640 excluding preferences, preferences, Device Attributes 1610, and Interaction Attributes 1620 respectively. K1, K2, W1, W2, W3 are weights, which can be constrained by K1+K2=1 and W1+W2+W3=1. Weights can vary among areas, or among cells of a given area.

Dynamic Threshold Calculation

RM 1695 can also include a Threshold Engine 1699 to dynamically adapt a threshold used for affinity determination, at the cell level. Without care, it can happen that only mainstream devices (devices which have a higher similarity towards other mainstream devices) can establish relationships among themselves, since the threshold can grow to a point where non-mainstream devices could always fail a threshold test. To overcome this, the following algorithm can be used to update the threshold periodically, based on a comparison of profile similarities SP (such as 554) with threshold (such as 563, 564). The algorithm linearly interpolates between the previous threshold value (OldTH) and an average profile similarity NewSP=⟨SP⟩ over the preceding time period, the latter being calculated over instances where affinity was found. Because affinity can be based on adjusted similarity and not (raw) profile similarity, NewSP can sometimes be lower than OldTH, so the algorithm can drive the threshold in both directions. The relative weight given to NewSP is labeled Shift, and can be determined based on the difference between NewSP and OldTH: NewDeviation is the difference between NewSP of the most recent time period and OldTH, while HistoricalDeviation is the average of the same deviation over the history of the cell. Finally, the steps can be made smaller as time passes, HistoryLength representing the number of time periods over which the algorithm has been operational. Table 1 shows pseudocode for the algorithm.

TABLE 1

Algorithm 1 Threshold Calculation

1: NewDeviation ← |OldTH − NewSP|
2: If NewDeviation < HistoricalDeviation then
3:     Shift ← (HistoricalDeviation − NewDeviation) /
           (HistoricalDeviation * HistoryLength)
4: else
5:     Shift ← HistoricalDeviation / (NewDeviation * HistoryLength)
6: end if
7:     NewThreshold ← (1−Shift) * OldTH + Shift * NewSP Particularly, if NewDeviation is much less than HistoricalDeviation, line 3 is followed, Shift is relatively large, and the threshold can be driven towards NewSP. If NewDeviation is much greater than HistoricalDeviation, then line 5 is followed, Shift is relatively small and only a small adjustment to the threshold value is made. Because the latter case can include situations where outliers dominate, disruption by outliers can be avoided.

In some examples, threshold values can be initialized based on profile similarities SP, i.e. without incorporation of behavioral effects. In further examples, threshold values can be initialized with devices assigned to areas and cells, but with travel between cells disabled.

Cell Learning

Turning back to Cell Manager 1691, the Cell 1690 can include a Learning Engine 1693, which can operate each time a new affinity is found within the Cell 1690 to learn the proxy profile for the cell. As discussed above, the proxy profile is analogous to a Device Profile 1661, and can be used to calculate a cell similarity score between Cell 1690 and Device Agent 1665. Particularly, the similarity between the cell's proxy profile and the Device Profile 1661 can be an indication of the probability that a Device Agent 1665 can find similar devices within the Cell 1690. When an affinity is found for a requesting Device Agent 1665, attributes of this agent's Device Profile 1661 can be stored in a memory. If the memory has reached its target length, the profile most dissimilar from Device Profile 1661 can be discarded to make room for Device Profile 1661. The proxy profile can be calculated from the profiles in the memory, for example by taking the mean value for each attribute. To illustrate, if the memory contains two profiles with values [0 1 0] and [1 1 1] for three attributes, then the proxy profile can be evaluated as the mean of these profiles, namely [0.5 1.0 0.5]. In some examples, the proxy profile can be accompanied by a set of proxy weights, one weight for each attribute in the proxy profile, varying inversely as the spread for that attribute. Thereby an attribute with a small standard deviation can have more discriminating power (for deciding whether an incoming Device Profile 1661 is similar to a given Cell 1690) than an attribute with a large standard deviation. Table 2 provides an algorithm for cell learning.

TABLE 2

Algorithm 2 Cell Context Learning

Input: {User Attributes 1640, Device Attributes 1610}
1: Delete element from memory which is most different from {1640, 1610}
2: Insert {1640, 1610} into memory
3: Learn proxy profile Example Performance Metrics The following measures can be used to assess a logical device network constructed using the disclosed technologies.

Network Coverage NC

Network coverage NC can be based on disjoint subnets of a logical device network such as 1200. NC can be defined as the fractional coverage of a subnet, averaged over all devices. In graph 1200, four of the devices (ABCD) belong to a subnet of size 4, out of 6 total devices. These four devices each have a fractional coverage of 4/6. Similarly, the two devices EF have a fractional coverage of 2/6. Thus, in this example, NC is the average of 4/6, 4/6, 4/6, 4/6, 2/6, 2/6, which is (4×4+2×2)/6×6=5/9=0.556. It can be desirable to have a high value of NC, ideally NC=1, so that certain classes of messages can percolate in-band to all devices. One example of such a message is a security warning if an intruder or bad actor is detected. Because the logical device network operates autonomously without central mediation, in-band transmission (e.g. in logical network plane 1430) can protect against attacks which compromise e.g. infrastructure equipment such as 1466, 1470, 1480.

Relative Network Coverage RNC

It can be straightforward to increase NC by adding edges to a logical device network, especially between disjoint subnets. However, maintaining connections with partner devices imposes a burden on computational resources and it is desirable to avoid a high total number of edges (connections) TE in the network. Then, a figure of merit RNC=NC/TE can be used. Higher RNC can be better. In the example of network 1200, NC=0.556 and TE=5, so that RNC=NC/TE=0.556/5=0.11.

It can be seen that removal of any one connection of loop BCD would leave NC unchanged but would decrease TE by 1, for an improved RNC=0.556/4=0.14. In some examples, redundant nodes can be identified (e.g. by analysis of a network graph), and a redundant edge (connection) can be selected and deleted from the network. Selection of a connection for deletion can be based on factors such as experience with past recommendations over a candidate connection, or numbers of connected partners each node of the candidate connection has. For example, if a given connection C joining devices D1, D2 supports a shared interest I, and each device D1, D2 has two, three, or more other partner devices sharing the interest I, then the connection C can be removed without detriment; whereas if node D1 or D2 has no other partner devices with shared interest I, then the connection C can be left intact.

Figure 17:
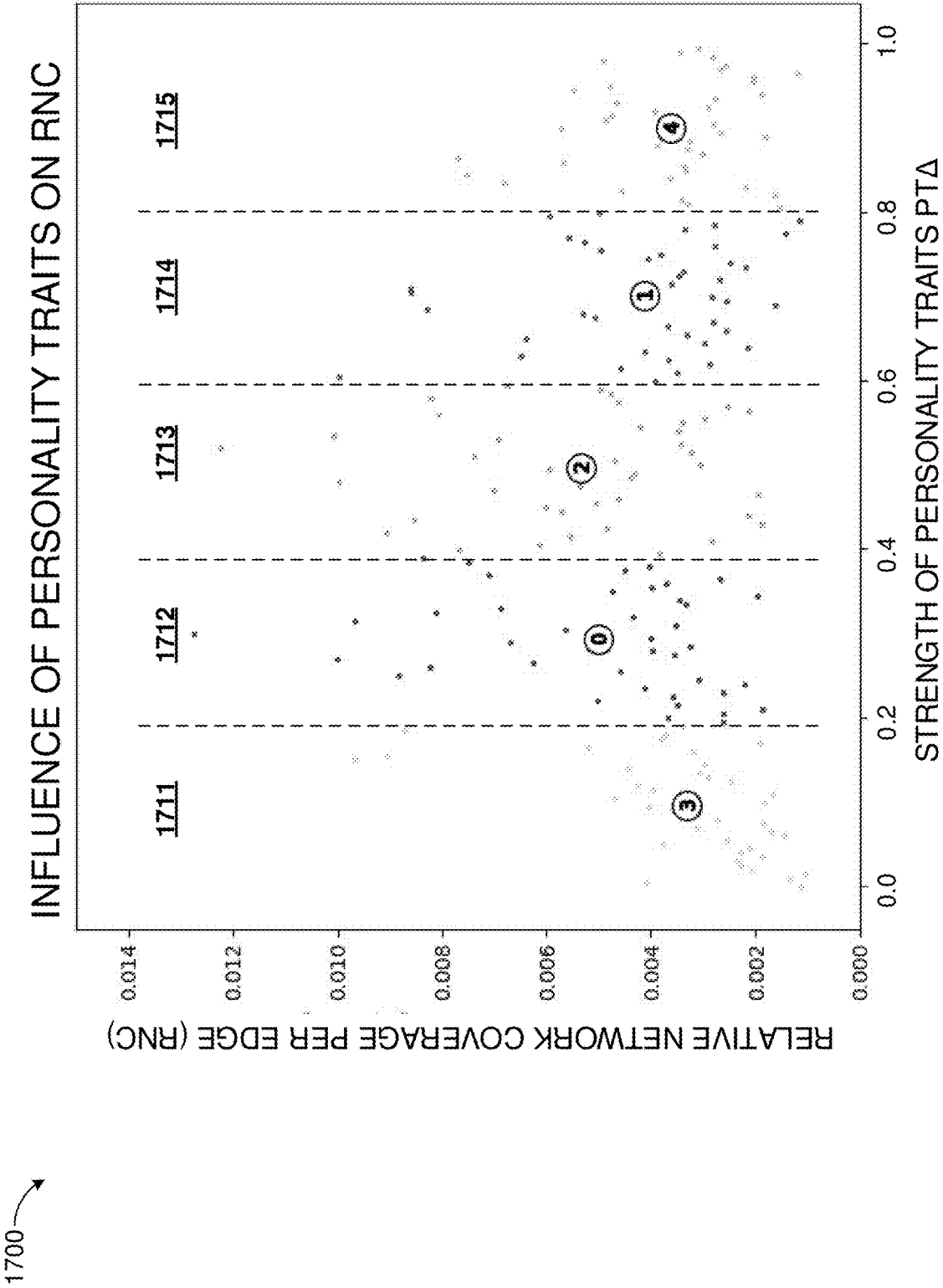
FIG. 17 is a chart illustrating the influence of personality traits on relative network coverage according to an example of the disclosed technologies.

FIG. 17 is a chart 1700 illustrating the influence of personality traits on relative network coverage according to an example of the disclosed technologies. In a series of simulations, the strengths of the personality traits was varied using a multiplicative coefficient PTA ranging from 0 (personality traits absent) to 1 (full amplitude of personality traits). RNC was evaluated for each simulation, and the results were grouped into five zones 1711-1715 for analysis. It can be seen that extreme values of PTA close to 0 or 1 provide a low value of RNC. Further analysis and simulations suggests that PTA of about 0.35 is optimal under the configuration of these simulations.

Example Additional Features

Context Dependence

The adjusted similarity determined by, or on behalf of, one device for another device, and hence affinity, can change over time for a variety of reasons. Firstly, the device profiles can change, due to a growth of interaction history, evolution of interests, or change in attributes. Secondly, the cell algorithms can change, for example by adjusting weights used for calculating similarity. However, additional contextual factors can also influence affinity determination. A pair of candidate devices could share two interests I1, I2, however it is possible that affinity could be found in the area for interest I1 but not in the area for interest I2. In further examples, network performance can be used to influence affinity determination. A threshold can be lowered for a pair of candidate devices belonging to disjoint subnets, or raised where the candidate devices already share a common partner.

Directional Connection

While in some examples, connections established between a pair of devices can be symmetric, this is not a requirement. Asymmetric or directional connections can arise for a variety of reasons, including but not limited to instances of partial affinity. Where device D1 has high neuroticism while device D2 has high conscientiousness, the connection could be primarily used for requests from D1 to D2 and recommendations returned from D2 to D1, with little or no request-recommendation traffic in the reverse directions. As another example, a producer-consumer relationship between a weather station and an irrigation controller can be for the weather station to share information with the irrigation controller, but not the other way around. In some examples of a directional connection, messages can be transmitted in both directions, however substantive information regarding in a shared interest can flow primarily or entirely in one direction. A connection can be directional with respect to one interest and directional, symmetric, or non-existent with respect to another shared interest.

Interaction Paradigms

Although some examples described herein utilize a request-response paradigm for communication between connected devices, this is not a requirement. The disclosed technologies can beneficially be applied for IoT devices using other interaction paradigms. Distributed sensor networks can share information using push notifications among connected devices. In some examples, the device agents in such networks can incorporate a learning engine as part of a collective swarm or hive intelligence model. Applications can include surveillance, environmental monitoring, or road traffic monitoring.

Business Applications

Internet enabled devices (such as printers, fax machines, phones) are widely used in business settings, and the disclosed technologies can be suitably applied to these IoT devices in their business context also. In a large organization, it can be a challenge for one department or team to discover relevant work or product information from another department or team. The disclosed technologies enable the formation of high-quality connections and information sharing within an organization, without supervision.

Example Simulation

A first simulation was used to assess the quality and number of connections formed, with traveling based on cell similarity and including principal attributes. For a first simulation experiment, 2000 devices were instantiated with randomly distributed attribute values for their principal attributes and device attributes. The values for interaction attributes were created dynamically during simulation as the devices traveled in a virtual space of one area and 400 cells. A single interest was used. The scope for affinity determinations was limited to single cells. Each device executed a travel route determined by a Travel Scheduling Service, and spent travel time in proportion 3:2:1 among the 3 cells for which it had highest cell similarity, followed by a request for a new travel route (as the cell similarities could have changed). For determining proxy profile, a cell memory size of 30 was used; the memory was initialized with randomly generated values. Instead of controlling simulation time, each simulation was run for 240,000 device activations: an activation corresponds to one travel hop, and at each activation there was a probability (between 0.5 and 1) of making a request for finding a partner device.

A control simulation was run where the travel schedule was randomly generated, without using cell similarities or principal attributes. Comparison of the first and control simulations showed the first simulation to have 6-10% greater similarity scores for connections formed, and 15-35% reduction in variance of similarity scores, as compared to the control experiment. In the control experiment, 57% of connections formed had mutual affinity, which jumped to 70% in the first simulation. Intelligent traveling incorporating attributes can be seen to provide better quality relationships than random travel.

A second simulation experiment was run with similar parameters to the first, however the 2000 devices were initialized as 1000 devices having randomly generated profiles and 1000 respective clone devices. The clone pairs can be considered to be perfectly matched partners. This simulation continued until every device had found its clone. Again, a control simulation was performed with random travel. The number of activations for all clones to be found was lower by a factor of 110 in the second simulation as compared to its control. Concurrently, the total number of connections formed was lower by a factor of 20. The intelligent traveling incorporating attributes can be seen to be vastly more efficient for finding high quality partner devices.

A Generalized Computer Environment

Figure 18:
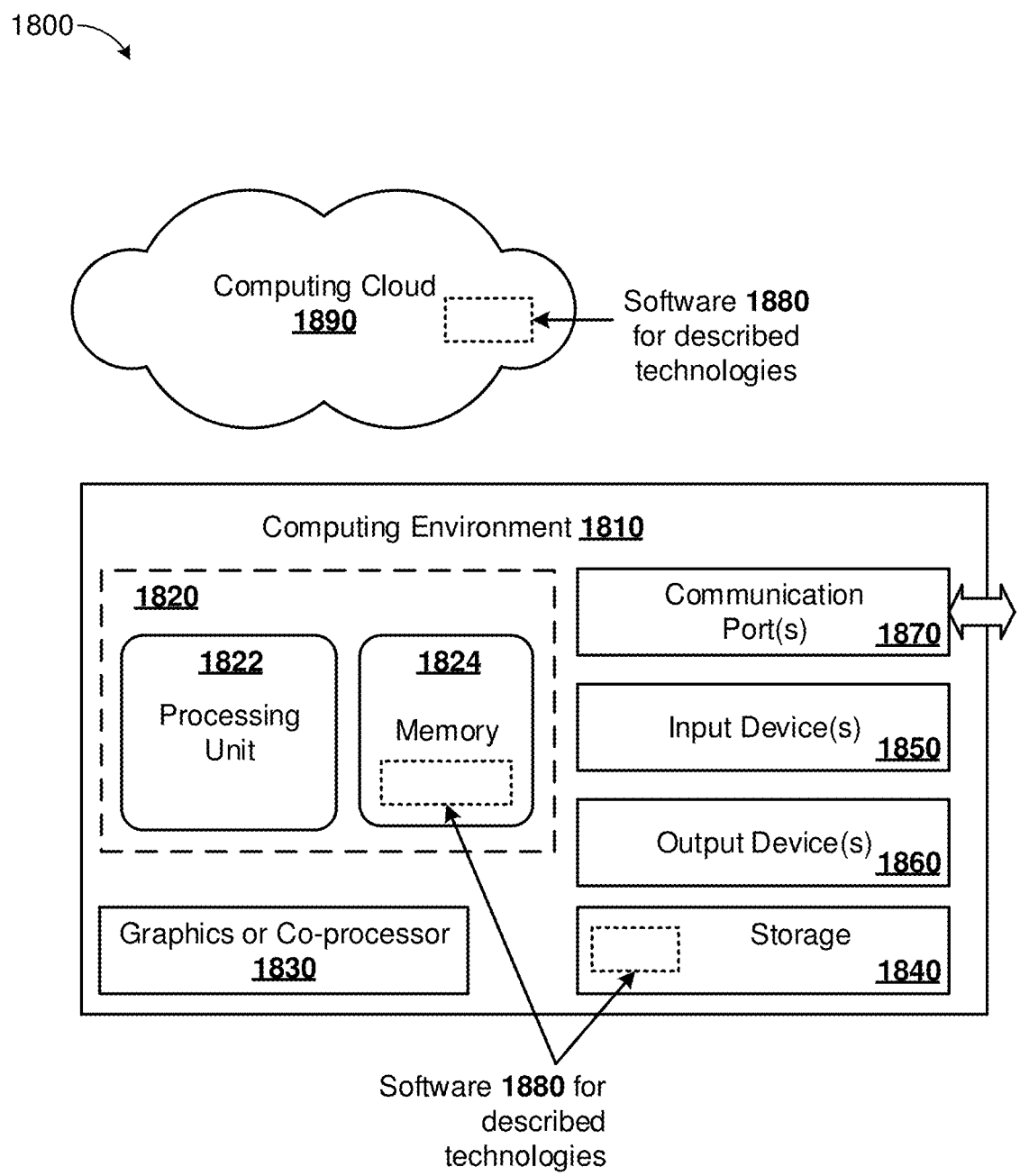
FIG. 18 is a diagram schematically depicting a computing environment suitable for implementation of disclosed technologies.

FIG. 18 illustrates a generalized example of a suitable computing system 1800 in which described examples, techniques, and technologies, including construction, deployment, operation, and maintenance of a logical network of IoT devices according to disclosed technologies can be implemented. The computing system 1800 is not intended to suggest any limitation as to scope of use or functionality of the present disclosure, as the innovations can be implemented in diverse general-purpose or special-purpose computing systems.

With reference to FIG. 18, computing environment 1810 includes one or more processing units 1822 and memory 1824. In FIG. 18, this basic configuration 1820 is included within a dashed line. Processing unit 1822 executes computer-executable instructions, such as for implementing any of the methods or objects described herein for integrating attributes with IoT devices, or various other architectures, components, handlers, managers, modules, and repositories described herein. Processing unit 1822 can be a general-purpose central processing unit (CPU), a processor in an application-specific integrated circuit (ASIC), or any other type of processor. In a multi-processing system, multiple processing units execute computer-executable instructions to increase processing power. Computing environment 1810 can also include a graphics processing unit or co-processing unit 1830. Tangible memory 1824 can be volatile memory (e.g., registers, cache, or RAM), non-volatile memory (e.g., ROM, EEPROM, or flash memory), or some combination thereof, accessible by processing units 1822, 1830. The memory 1824 stores software 1880 implementing one or more innovations described herein, in the form of computer-executable instructions suitable for execution by the processing unit(s) 1822, 1830. The memory 1824 can also store configuration data, UI displays, browser code, data structures including data tables, working tables, change logs, output structures, input fields, output fields, data values, indices, or flags, as well as other configuration and operational data.

A computing system 1810 can have additional features, such as one or more of storage 1840, input devices 1850, output devices 1860, or communication ports 1870. An interconnection mechanism (not shown) such as a bus, controller, or network interconnects the components of the computing environment 1810. Typically, operating system software (not shown) provides an operating environment for other software executing in the computing environment 1810, and coordinates activities of the components of the computing environment 1810.

The tangible storage 1840 can be removable or non-removable, and includes magnetic disks, magnetic tapes or cassettes, CD-ROMs, DVDs, or any other medium which can be used to store information in a non-transitory way and which can be accessed within the computing environment 1810. The storage 1840 stores instructions of the software 1880 (including instructions and/or data) implementing one or more innovations described herein.

The input device(s) 1850 can be a mechanical, touch-sensing, or proximity-sensing input device such as a keyboard, mouse, pen, touchscreen, trackball, a voice input device, a scanning device, or another device that provides input to the computing environment 1810. The output device(s) 1860 can be a display, printer, speaker, optical disk writer, or another device that provides output from the computing environment 1810.

The communication port(s) 1870 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1800 can also include a computing cloud 1890 in which instructions implementing all or a portion of the disclosed technology are executed. Any combination of memory 1824, storage 1840, and computing cloud 1890 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 19:
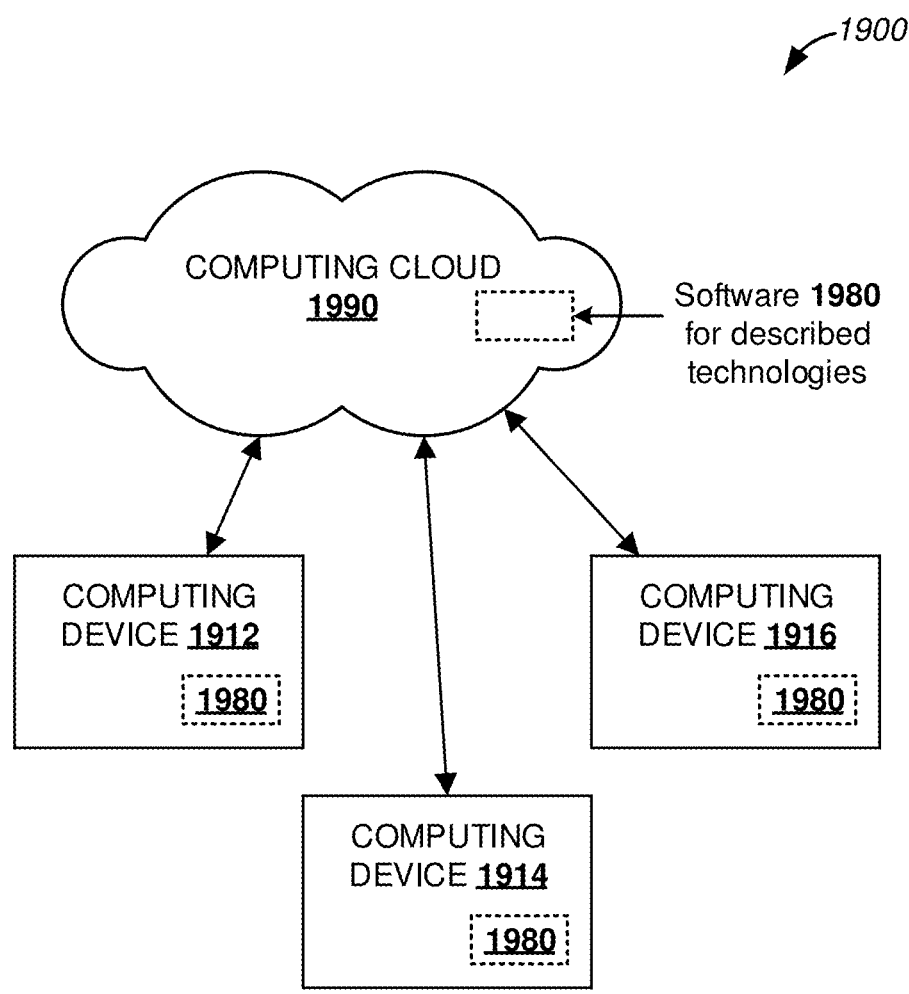
FIG. 19 is a diagram schematically depicting computing devices operating in conjunction with a computing cloud for implementation of disclosed technologies.

FIG. 19 depicts an example cloud computing environment 1900 in which the described technologies can be implemented. The cloud computing environment 1900 comprises a computing cloud 1990 containing resources and providing services. The computing cloud 1990 can comprise various types of cloud computing resources, such as computer servers, data storage repositories, networking resources, and so forth. The computing cloud 1990 can be centrally located (e.g., provided by a data center of a business or organization) or distributed (e.g., provided by various computing resources located at different locations, such as different data centers and/or located in different cities or countries).

The computing cloud 1990 can be operatively connected to various types of computing devices (e.g., client computing devices), such as computing devices 1912, 1914, and 1916, and can provide a range of computing services thereto. One or more of computing devices 1912, 1914, and 1916 can be computers (e.g., server, virtual machine, embedded systems, desktop, or laptop computers), mobile devices (e.g., tablet computers, smartphones, or wearable appliances), other types of computing devices, or any Internet-of-Things devices. Links between computing cloud 1990 and computing devices 1912, 1914, and 1916 can be over wired, wireless, or optical links, or any combination thereof, and can be short-lived or long-lasting. Links can be continuous or sporadic. These links can be stationary or can move over time, being implemented over varying paths and having varying attachment points at each end. Computing devices 1912, 1914, and 1916 can also be connected to each other.

Computing devices 1912, 1914, and 1916 can utilize the computing cloud 1990 to obtain computing services and perform computing operations (e.g., data processing, data storage, and the like). Particularly, software 1980 for performing the described innovative technologies can be resident or executed in the computing cloud 1990, in computing devices 1912, 1914, and 1916, or in a distributed combination of cloud and computing devices.

GENERAL CONSIDERATIONS

As used in this disclosure, the singular forms "a," "an," and "the" include the plural forms unless the context clearly dictates otherwise. Additionally, the terms "includes" and "incorporates" mean "comprises." Further, the terms "coupled" or "attached" encompass mechanical, electrical, magnetic, optical, as well as other practical ways of coupling or linking items together, and does not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "access," "add," "adjust," "apply," "assign," "break," "build," "calculate," "call," "classify," "collect," "combine," "compare," "compile," "composite," "configure," "connect," "convey," "create," "decide," "define," "delete," "determine," "drop," "establish," "exchange," "execute," "extend," "find," "flag," "form," "forward," "generate," "hop," "host," "identify," "insert," "invoke," "learn," "link," "load," "lower," "maintain," "make," "map," "message," "migrate," "monitor," "obtain," "perceive," "perform," "process," "provide," "prune," "raise," "receive," "recommend," "register," "remove," "request," "respond," "schedule," "select," "send," "set," "share," "split," "store," "supervise," "test," "train," "transmit," "travel," "trigger," "update," "use," "visit," "wake," or "weight," to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 18, computer-readable storage media include memory 1824, and storage 1840. The term computer-readable storage media does not include signals and carrier waves. In addition, the term computer-readable storage media does not include communication ports (e.g., 1870) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, Angular, C, C++, C #, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more computer-readable media storing instructions which, when executed by one or more processors, cause the processors to perform a method comprising:
   obtaining profiles of respective first and second devices, each of the profiles comprising device attributes, principal attributes of a principal associated with the respective device, and interaction attributes for the respective device;
   calculating a similarity score between the first and second devices based on the device attributes, the principal attributes, and the interaction attributes of the respective profiles, wherein the principal attributes comprise personality attributes of the principal according to a personality model;
   determining affinity between the first and second devices based on the similarity score, wherein the determining affinity comprises:
      adjusting the similarity score for at least one of the first device or the second device based on at least one behavioral attribute of the first device or the second device, and
      calculating the affinity based on the adjusted similarity score and a threshold value;
   wherein a rate, at which the first or second device seeks affinity testing with other devices, is dependent on the at least one behavioral attribute; and
   responsive to the determined affinity, causing a logical network connection to be formed between the first and second devices.

2. The one or more computer-readable media of claim 1, wherein the principal associated with the respective device is a user of the respective device.

3. The one or more computer-readable media of claim 1, wherein the personality attributes comprise a measure of extroversion.

4. The one or more computer-readable media of claim 1, wherein the personality attributes comprise respective measures of one or more traits selected from: extroversion, neuroticism, openness, conscientiousness, or agreeableness.

5. The one or more computer-readable media of claim 1, wherein the determining affinity comprises determining a first affinity from a perspective of the first device and determining presence or absence of a second affinity from a perspective of the second device.

6. The one or more computer-readable media of claim 5, wherein the method further comprises:
   determining a classification for the logical network connection based on the determined presence or absence of the second affinity.

7. The one or more computer-readable media of claim 1, wherein the adjusted similarity score is a first adjusted similarity score for the first device, and wherein the method further comprises correspondingly adjusting the similarity score for the second device to obtain a second adjusted similarity score distinct from the first adjusted similarity score, and wherein the calculating the affinity is further based on the second adjusted similarity score.

8. The one or more computer-readable media of claim 1, wherein the at least one behavioral attribute comprises one or more of: attraction, helpfulness, or interactivity.

9. The one or more computer-readable media of claim 1, wherein the at least one behavioral attribute comprises a first behavioral attribute jointly dependent on a first principal attribute of the first device and a second principal attribute, distinct from the first principal attribute, of the second device.

10. The one or more computer-readable media of claim 1, wherein:
   the principal associated with the respective device is a user of the respective device;
   the personality attributes comprise respective measures of one or more traits selected from: extroversion, neuroticism, openness, conscientiousness, or agreeableness;
   the at least one behavioral attribute comprises a first behavioral attribute jointly dependent on a first principal attribute of the first device and a second principal attribute, distinct from the first principal attribute, of the second device; and
   the determining affinity comprises determining a first affinity from a perspective of the first device and determining presence or absence of a second affinity from a perspective of the second device.

11. The one or more computer-readable media of claim 1, wherein the calculating the similarity score comprises calculating a partial similarity between the principal attributes, and where the similarity score is dependent on the partial similarity.

12. A method comprising:
   obtaining profiles of respective first and second devices, each of the profiles comprising device attributes, principal attributes of a principal associated with the respective device, and interaction attributes for the respective device;
   calculating a similarity score between the first and second devices based on the device attributes, the principal attributes, and the interaction attributes of the respective profiles, wherein the principal attributes comprise personality attributes of the principal according to a personality model;
   determining affinity between the first and second devices based on the similarity score, wherein the determining affinity comprises:
      adjusting the similarity score for at least one of the first device or the second device based on at least one behavioral attribute of the first device or the second device;
      calculating the affinity based on the adjusted similarity score and a threshold value;
   wherein a rate, at which the first device seeks affinity testing with other devices, is dependent on the at least one behavioral attribute; and responsive to the determined affinity, causing a logical network connection to be formed between the first and second devices.

13. The method of claim 12, wherein the determining of affinity is bidirectional.

14. The method of claim 12, wherein the determining of affinity is directional.

15. The method of claim 12, further comprising:
determining the principal attributes based on input from a user of the respective device.

16. The method of claim 15, wherein the calculating the similarity score comprises calculating respective partial similarities between the device attributes, between the principal attributes, and between the interaction attributes of the first and second devices; and performing a weighted combination of the partial similarities to obtain the similarity score.

17. The method of claim 12, further comprising:
forwarding a request from the first device to the second device over the logical network connection; and
forwarding a response to the request, from the second device to the first device.

18. The method of claim 12, further comprising:
identifying a shared interest between the first and second devices;
wherein the determining affinity is responsive to the identified shared interest.

19. A system comprising:
one or more hardware processors with memory coupled thereto; and
one or more computer-readable media storing instructions which, when executed by the one or more hardware processors, cause the one or more hardware processors to perform operations comprising:
obtaining profiles of respective first and second devices, each of the profiles comprising device attributes, principal attributes of a principal associated with the respective device, and interaction attributes for the respective device;
calculating a similarity score between the first and second devices based on the device attributes, the principal attributes, and the interaction attributes of the respective profiles, wherein the principal attributes comprise personality attributes of the principal according to a personality model;
determining affinity between the first and second devices based on the similarity score, wherein the determining affinity comprises:
adjusting the similarity score for at least one of the first device or the second device based on at least one behavioral attribute of the first device or the second device, and
calculating the affinity based on the adjusted similarity score and a threshold value;
wherein a rate, at which the first or second device seeks affinity testing with other devices, is dependent on the at least one behavioral attribute; and
responsive to the determined affinity, causing a logical network connection to be formed between the first and second devices.

* * * * *